(12) United States Patent
Tateishi et al.

(10) Patent No.: US 7,211,134 B2
(45) Date of Patent: May 1, 2007

(54) DYE MIXTURE AND INK CONTAINING THE SAME

(75) Inventors: Keiichi Tateishi, Kanagawa (JP); Shigeaki Tanaka, Kanagawa (JP); Yoshiharu Yabuki, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 169 days.

(21) Appl. No.: 10/502,009

(22) PCT Filed: Jan. 17, 2003

(86) PCT No.: PCT/JP03/00372

§ 371 (c)(1),
(2), (4) Date: Jul. 20, 2004

(87) PCT Pub. No.: WO03/062324

PCT Pub. Date: Jul. 31, 2003

(65) Prior Publication Data

US 2005/0215773 A1  Sep. 29, 2005

(30) Foreign Application Priority Data

Jan. 22, 2002 (JP) ............................. 2002-012868
Jan. 22, 2002 (JP) ............................. 2002-012990

(51) Int. Cl.
*C09D 11/00* (2006.01)
*C09D 11/02* (2006.01)
*C09B 47/04* (2006.01)

(52) U.S. Cl. ............................. 106/31.49; 8/638; 8/661

(58) Field of Classification Search ............ 106/31.49, 106/31.78; 8/638, 661
See application file for complete search history.

(56) References Cited

U.S. PATENT DOCUMENTS

| | | | |
|---|---|---|---|
| 2,861,005 A | 11/1958 | Siegel | |
| 4,711,641 A * | 12/1987 | Nakamatsu et al. | 8/524 |
| 5,356,444 A * | 10/1994 | Schwarz et al. | 8/638 |
| 5,882,390 A * | 3/1999 | Nagai et al. | 106/31.49 |
| 5,980,623 A * | 11/1999 | Hiraoka et al. | 106/31.49 |
| 6,190,422 B1 | 2/2001 | Carr | |
| 6,251,177 B1 * | 6/2001 | Stawitz | 106/410 |
| 6,332,918 B1 | 12/2001 | Kenworthy | |
| 7,087,107 B2 * | 8/2006 | Tateishi et al. | 106/31.49 |
| 7,147,698 B2 * | 12/2006 | Patel | 106/31.49 |
| 2003/0164114 A1 * | 9/2003 | Kitayama et al. | 106/31.46 |
| 2005/0231574 A1 * | 10/2005 | Ozawa | 347/100 |
| 2006/0016026 A1 * | 1/2006 | Tateishi et al. | 8/539 |
| 2006/0162615 A1 * | 7/2006 | Patel | 106/31.49 |
| 2006/0180051 A1 * | 8/2006 | Patel | 106/31.49 |
| 2006/0201387 A1 * | 9/2006 | Patel | 106/31.49 |

FOREIGN PATENT DOCUMENTS

| | | | |
|---|---|---|---|
| DE | 3411476 A1 | | 10/1984 |
| JP | 4-39365 A | | 2/1992 |
| WO | WO 00/08103 | * | 2/2000 |
| WO | WO 02/060994 A1 | | 8/2002 |

* cited by examiner

*Primary Examiner*—Helene Klemanski
(74) *Attorney, Agent, or Firm*—Buchanan Ingersoll & Rooney PC

(57) ABSTRACT

A novel compound having sufficiently high fastness to light, heat, humidity and active gas in the environment and a coloring composition using the compound, particularly, an ink for ink jet recording, an ink jet recording method and a method for improving the preservability of formed image, which can form an image having high fastness to light and ozone gas in the environment. A phthalocyanine dye mixture having a specific structure and an ink, an ink for ink jet recording, an ink jet recording method and a method for improving the preservability of formed image, using the phthalocyanine dye mixture.

9 Claims, No Drawings

DYE MIXTURE AND INK CONTAINING THE SAME

TECHNICAL FIELD

The present invention relates to a novel dye mixture improved in the solubility and excellent in the fastness; a coloring composition containing the dye mixture, particularly, a coloring composition for forming an image, such as ink, water-soluble ink for ink jet recording and coating material; an ink jet recording method; and a method for improving ozone gas resistance of a colored image material.

BACKGROUND ART

In recent years, the image recording material is predominated particularly by a material for forming a color image. More specifically, a recording material using an ink jet system, a recording material using a heat-sensitive transfer system, a recording material using an electro-photographic system, a silver halide light-sensitive material using a transfer system, a printing ink, a recording pen and the like are popularly used. Also, a color filter for recording/reproducing a color image is used in an image pick-up element such as CCD of photographing equipment, or in LCD or PDP of display.

In these color image recording materials or color filters, three primary color dyes (dyes or pigments) by a so-called additive or subtractive color mixing method are used for reproducing or recording a full color image, however, a dye having absorption properties capable of realizing a preferred color reproduction region and having fastness capable of enduring various use conditions is not found at present and improvements are keenly demanded.

The ink jet recording method has been abruptly spread and is further growing because the material cost is low, high-speed recording can be obtained, noises are less generated at the recording and color recording is easy.

The ink jet recording method includes a continuous system of continuously jetting out a liquid droplet and an on-demand system of jetting out a liquid droplet according to image information signals, and the ejection system therefor includes a system of ejecting a liquid droplet by applying a pressure using a piezoelectric device, a system of ejecting a liquid droplet by generating bubbles in ink using heat, a system of using an ultrasonic wave, and a system of ejecting a liquid droplet by suction using an electrostatic force.

The ink used for ink jet recording includes an aqueous ink, an oily ink and a solid (fusion-type) ink.

The dye used in such an ink for ink jet recording is required to have good solubility or dispersibility in a solvent, enable high-density recording, provide good (color) hue, have fastness to light, heat and active gas in environment (for example, oxidative gas such as NOx and ozone, and SOx), exhibit excellent resistance against water and chemicals, ensure good fixing property to an image-receiving material and less blurring, give an ink having excellent storability, have no toxicity and high purity and be available at a low cost.

However, it is very difficult to find out a dye satisfying these requirements in a high level. In particular, the dye is strongly demanded to have good cyan (color) hue and fastness to light, humidity and heat and when printed on an image-receiving material having an ink-accepting layer containing a porous white inorganic pigment particle, be resistant against oxidative gas such as ozone in the environment.

Examples of the skeleton (i.e., the basic structure) of the cyan dye used for such an ink for ink jet recording include a phthalocyanine structure, an anthraquinone structure and a triphenylmethane structure. Among these, the phthalocyanine structure is representative.

Representative examples of the phthalocyanine dye which has been reported and is used over the widest range include phthalocyanine derivatives classified into the following (1) to (6).

(1) Copper phthalocyanine-base dyes such as Direct Blue 86 and Direct blue 87 [for example, $Cu\text{-}Pc\text{-}(SO_3Na)_m$: a mixture of m=1 to 4]. In the formula and hereinafter, "Pc" means a phthalocyanine skeleton.

(2) Direct Blue 199 and phthalocyanine-base dyes described in JP-A-62-190273 (the term "JP-A" as used herein means an "unexamined published Japanese patent application"), JP-A-63-28690, JP-A-63-306075, JP-A-63-306076, JP-A-2-131983, JP-A-3-122171, JP-A-3-200883, JP-A-7-138511, etc. [for example, $Cu\text{-}Pc\text{-}(SO_3Na)_m(SO_2NH_2)_n$: a mixture of m+n=1 to 4].

(3) Phthalocyanine-base dyes described in JP-A-63-210175, JP-A-63-37176, JP-A-63-304071, JP-A-5-171085, WO00/08102, etc. [for example, $Cu\text{-}Pc\text{-}(CO_2H)_m(CONR_1R_2)_n$: m+n is an integer of 0 to 4].

(4) Phthalocyanine-base dyes described in JP-A-59-30874, JP-A-1-126381, JP-A-1-190770, JP-A-6-16982, JP-A-7-82499, JP-A-8-34942, JP-A-8-60053, JP-A-8-113745, JP-A-8-310116, JP-A-10-140063, JP-A-10-298463, JP-A-11-29729, JP-A-11-320921, EP-A-173476, EP-A-468649, EP-A-559309, EP-A-596383, German Patent 3,411,476, U.S. Pat. No. 6,086,955, WO99/13009, British Patent Publication 2,341,868A, etc. [for example, $Cu\text{-}Pc\text{-}(SO_3H)_m(SO_2NR_1R_2)_n$: m+n is an integer of 0 to 4 and $m \neq 0$ (i.e., m is not 0)].

(5) Phthalocyanine-base dyes described in JP-A-60-208365, JP-A-61-2772, JP-A-6-57653, JP-A-8-60052, JP-A-8-295819, JP-A-10-130517, JP-A-11-72614, Japanese Unexamined Published International Application Nos. 11-515047 and 11-515048, EP-A-196901, WO95/29208, WO98/49239, WO98/49240, WO99/50363, WO99/67334, etc. [for example, $Cu\text{-}Pc\text{-}(SO_3H)_l(SO_2NH_2)_m(SO_2NR_1R_2)_n$: l+m+n is an integer of 0 to 4].

(6) Phthalocyanine-base dyes described in JP-A-59-22967, JP-A-61-185576, JP-A-1-95093, JP-A-3-195783, EP-A-649881, WO00/08101, WO00/08103, etc. [for example, $Cu\text{-}Pc\text{-}(SO_2NR_1R_2)_n$: n is an integer of 1 to 5].

Phthalocyanine-base dyes widely used in general at present, represented by Direct Blue 87 and Direct Blue 199 and described in those patent publications, are excellent in the light fastness as compared with magenta and yellow dyes, however, are disadvantageously liable to cause a problem ascribable to the solubility of dye. For example, on great occasions, dissolution failure occurs at the production to cause a production trouble or insoluble matters precipitate during storage or on use of the product to bring about a problem. Particularly, in the ink jet recording described above, clogging of printing head or ejection failure is caused by the precipitation of dye and this gives rise to a problem of serious deterioration of the printed image.

Furthermore, discoloration readily occurs due to oxidative gases such as ozone, which are often taken as a problem also from an environmental issue, and this causes a large problem of great reduction in the printing density.

At present, the field using the ink jet recording is abruptly expanding and if this recording system is more widely used in home, SOHO, business and the like, the dye or ink composition is exposed to various use conditions or use environments, as a result, the case of generating a trouble ascribable to solubility failure of the cyan dye or causing a problem of discoloration of the printed image on exposure to light or active gas in the environment increases. To cope with this, a dye and an ink composition particularly having good (color) hue, excellent light fastness and high resistance against active gases (for example, oxidative gas such as NOx and ozone, and SOx) in the environment are more strongly demanded.

However, it is very difficult to find out a phthalocyanine dye and an ink containing the dye, which can satisfy these requirements in a high level.

The phthalocyanine dyes imparted with ozone gas resistance are heretofore disclosed, for example, in JP-A-3-103484, JP-A-4-39365 and JP-A-2000-303009, however, none of these dyes have succeeded in satisfying both the (color) hue and the fastness to light and oxidative gas. Particularly, a case of reporting the property of dye as an index for the ozone gas resistance is heretofore not known.

In general, the phthalocyanine dye (compound) is produced by sulfonating an unsubstituted phthalocyanine compound and in the case of using it as a water-soluble dye, an alkali metal salt of the sulfonated compound, such as sodium salt, is used as it is, and in the case of deriving an oil-soluble dye, a dye synthesized after sulfonation, by sulfonyl chloridation and amidation reactions can be used as described in WO00/17275, 00/08103, 00/08101 and 98/41853 and JP-A-10-36471.

In this case, sulfonation can take place at any site of the phthalocyanine nucleus and the number of sites sulfonated is difficult to control. Accordingly, when a sulfo group is introduced under such reaction conditions, the site and number of sulfo groups introduced into the product cannot be specified and a mixture of those different in the number of substituents or in the substitution site inevitably results.

In this mixture, a component having low solubility, for example, a component where the number of sulfonated site on the phthalocyanine nucleus is 0 or 1, is mixed and the solubility is liable to be insufficient for use as a water-soluble dye. Thus, the improvement of solubility is demanded.

Problems to be Solved by the Invention:

The present invention has been made to solve those problems in conventional techniques and achieve the following objects. That is, a first object of the present invention is to provide a novel dye mixture having absorption properties with excellent color reproduction as a dye for three primary colors, having sufficiently high fastness to light, heat, humidity and active gas in the environment, and having excellent solubility.

A second object of the present invention is to provide a phthalocyanine dye mixture having excellent ink storage stability and recoverability from clogging, giving good (color) hue, enabling the formation of an image having high fastness to light and active gases in the environment, particularly against ozone gas, and ensuring high recording stability even when used in various environmental conditions, which is particularly effective for use in an ink, an ink for ink jet recording, an ink set for ink jet recording comprising the ink for ink jet recording, an ink jet recording method using the ink for ink jet recording, and a container or the like for housing the ink for ink jet recording.

Means to Solve the Problems:

As a result of extensive investigations on phthalo-cyanine dyes having good (color) hue and solubility and having high fastness to light and gas (particularly ozone gas), the present inventors have found that the above-described objects can be attained by a phthalocyanine dye mixture having a specific structure which has been heretofore not known.

Disclosure of the Invention:

The present invention has been accomplished based on this finding. The means for solving the problems is as follows.

That is,

<1> a dye mixture comprising a plurality of different dyes represented by the following formula (I):

Formula (I):

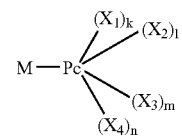

Formula (II):

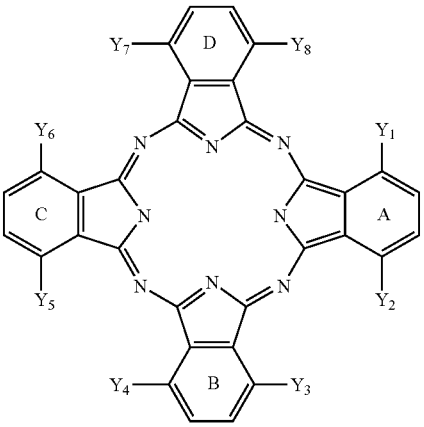

wherein M represents a hydrogen atom, a metal atom or an oxide, hydroxide or halide thereof; Pc represents a (k+l+m+n)-valent phthalocyanine nucleus represented by formula (II); $X_1$, $X_2$, $X_3$ and $X_4$ each independently represents a substituent selected from the group consisting of —SO—$R_1$, —$SO_2$—$R_1$, —$SO_2NR_2R_3$, —$CONR_2R_3$, —$CO_2$—$R_1$ and CO—$R_1$ and at least one substituent represented by $X_1$, at least one substituent represented by $X_2$, at least one substituent represented by $X_3$ and at least one substituent represented by $X_4$ are present in respective rings of four benzene rings {A, B, C and D in formula (II)} of the phthalocyanine nucleus, provided that the case where $X_1$, $X_2$, $X_3$ and $X_4$ all are the same is excluded and at least one of $X_1$, $X_2$, $X_3$ and $X_4$ has an ionic hydrophilic group as a substituent; $R_1$ represents a substituted or unsubstituted alkyl group, a substituted or unsubstituted aryl group or a substituted or unsubstituted heterocyclic group; $R_2$ represents a hydrogen atom, a substituted or unsubstituted alkyl group, a substituted or unsubstituted aryl group or a substituted or unsubstituted heterocyclic group; $R_3$ represents a substituted or unsubstituted alkyl group, a substituted or unsubstituted aryl group or a substituted or unsubstituted heterocyclic group; k, l, m and n represent an integer of 0<k<8, an integer of 0<l<8, an integer of 0≦m<8 and an integer of 0≦n<8, provided that k and/or l and/or m and/or n each independently represents a number satisfying 4≦k+ l+m+n≦8; and $Y_1$, $Y_2$, $Y_3$, $Y_4$, $Y_5$, $Y_6$, $Y_7$ and $Y_8$ each independently represents a hydrogen atom and/or a monovalent substituent and these monovalent substituents each may further have a substituent;

<2> the dye mixture as described in <1>, wherein the phthalocyanine nucleus represented by formula (II) is represented by the following formula (III):

Formula (III):

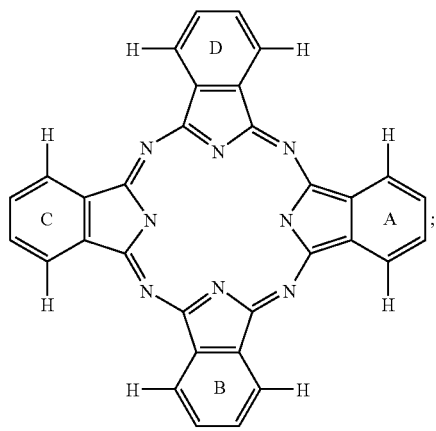

<3> the dye mixture as described in <1>, wherein in the dye represented by formula (I), $X_1$, $X_2$, $X_3$ and $X_4$ each independently represents a substituent selected from the group consisting of —SO—$R_1$, —$SO_2$—$R_1$ and —$SO_2NR_2R_3$, and at least one substituent represented by $X_1$, at least one substituent represented by $X_2$, at least one substituent represented by $X_3$ and at least one substituent represented by $X_4$ are present in respective rings of four benzene rings {A, B, C and D in formula (II) or (III)} of the phthalocyanine nucleus;

<4> the dye mixture as described in <1>, wherein the dye represented by formula (I) is represented by the following formula (IV):

Formula (IV):

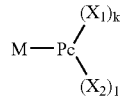

wherein M represents a hydrogen atom, a metal atom or an oxide, hydroxide or halide thereof; Pc represents a (k+l)-valent phthalocyanine nucleus represented by formula (III); $X_1$ and $X_2$ each independently represents a substituent selected from the group consisting of —SO—$R_1$, —$SO_2$—$R_1$ and —$SO_2NR_2R_3$ and at least one substituent represented by $X_1$ and at least one substituent represented by $X_2$ are present in respective rings of four benzene rings {A, B, C and D in formula (III)} of the phthalocyanine nucleus, provided that $X_1$ and $X_2$ are not the same and at least one of $X_1$ and $X_2$ has an ionic hydrophilic group as a substituent; $R_1$ represents a substituted or unsubstituted alkyl group, a substituted or unsubstituted aryl group or a substituted or unsubstituted heterocyclic group; $R_2$ represents a hydrogen atom, a substituted or unsubstituted alkyl group, a substituted or unsubstituted aryl group or a substituted or unsubstituted heterocyclic group; $R_3$ represents a substituted or unsubstituted alkyl group, a substituted or unsubstituted aryl group or a substituted or unsubstituted heterocyclic group; k and l represent an integer of 0<k<8 and an integer of 0<l<8, provided that k and/or l each independently represents a number satisfying 4≦k+l≦8;

<5> the dye mixture as described in <1>, wherein in formulae (I) and (II), at least one group of $X_1$ to $X_4$ and $Y_1$ to $Y_8$ has at least one asymmetric carbon;

<6> an ink comprising the dye mixture described in any one of <1> to <4>;

<7> an ink as described in <6>, which is used as an ink for ink jet recording;

<8> an ink jet recording method comprising forming an image using the ink described in <7> on an image-receiving material comprising a support having thereon an ink image-receiving layer containing a white inorganic pigment particle; and <9> a method for improving ozone resistance of a colored image material, comprising forming an image using the ink described in <7>.

BEST MODE FOR CARRYING OUT THE INVENTION

The present invention is described in detail below.

[Production Method of Dye Mixture, and Dye Mixture Obtained by the Production Method]

The production method of the phthalocyanine dye mixture of the present invention (the phthalocyanine dye mixture used here has the same meaning as the dye mixture of the present invention) is a method of reacting a phthalonitrile (o-phthalonitrile) having previously introduced therein a soluble group or a precursor thereof, or a phthalic acid derivative (hereinafter, substituted phthalonitrile, substituted phthalic acid diamide, substituted phthalimide, substituted phthalic acid and a salt-thereof; and substituted phthalic anhydride are called "phthalic acid derivatives") having previously introduced therein a soluble group or a precursor thereof, with a metal derivative to produce a dye mixture. According to this production method, a soluble group or a precursor thereof is previously introduced to the raw material phthalic acid derivative, so that a soluble group or a precursor thereof can be introduced without fail into the structure of the obtained phthalocyanine compound, for example, into four benzene rings or a specific number of desired soluble groups can be introduced.

Furthermore, as described later, by introducing an electron-withdrawing (i.e., electron-attractive) soluble group, the oxidation potential can be controlled to be high (more positive). Therefore, a dye mixture having absorption properties with excellent color reproducibility as a dye for three primary colors, having sufficiently high fastness to light, heat, humidity and active gases in the environment, and having excellent solubility can be produced.

Also, when an asymmetric carbon is introduced into the molecule and a plurality of steric isomers are allowed to be present, the crystallization can be inhibited because the steric isomers cannot be stacked one on another, and therefore, the dye in an ink can be expected to have storage stability.

The present inventors have studied on the crystallinity and storage stability of a plurality of phthalocyanine compounds, as a result, it has been found that when an asymmetric carbon is introduced, the properties (e.g., good (color) hue, fastness) of the compound before the introduction can be at the same time obtained.

In the production method of the dye mixture of the present invention, at least two kinds of phthalic acid derivatives different in the soluble group or a precursor thereof are preferably used.

By this use, a dye mixture having a distribution determined by the charged ratio of phthalic acid derivatives used and having different kinds of soluble groups and different bonding forms is obtained, so that the solubility is more improved. Thus, the present invention also provides a method for improving the solubility of the dye mixture.

As a result thereof, for example, when the dye mixture of the present invention is used in an ink for ink jet recording, a good ink for ink jet recording improved in the storage stability and recoverability from clogging can also be provided.

The raw material phthalic acid derivative which can be used in the production method of the dye mixture of the present invention is suitably (1) a substituted phthalonitrile (Compound A shown below), (2) a substituted diiminoisoindoline (Compound B shown below), (3) a substituted phthalic acid diamide (Compound C shown below), (4) a substituted phthalimide (Compound D shown below), (5) a substituted phthalic acid or a salt thereof (Compound E shown below) or (6) a substituted phthalic anhydride (Compound F shown below), represented by the following formula (V).

A compound having a soluble group or a precursor thereof and as the metal derivative, a metal derivative represented by the following formula (VI) are reacted, whereby the dye mixture represented by formula (I) can be produced.

Also, when X' in Compounds A to F as the raw material phthalic acid derivative is a precursor of a soluble group, the precursor is converted into a soluble group after the formation of the phthalocyanine ring, whereby the dye mixture represented by formula (I) of the present invention can be produced.

Formula (V):

Compound A
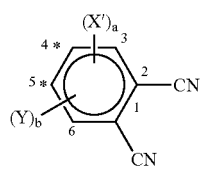

Compound B
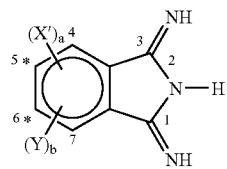

Compound C
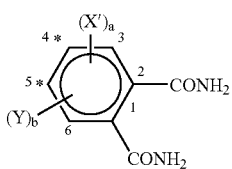

Compound D
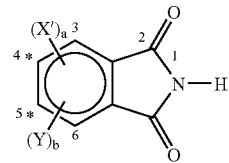

Compound E
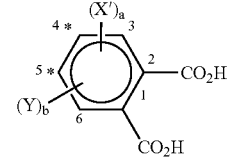

Compound F
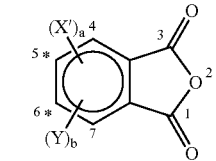

Formula (VI):

$$M\text{—}(Z)_d$$

Formula (I):

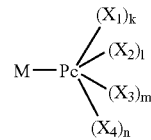

In Compounds A to F, X' represents a soluble group or a precursor thereof.

In formula (VI), M represents a hydrogen atom, a metal atom or an oxide, hydroxide or halide thereof, Z represents a monovalent or divalent ligand such as halogen atom, acetate anion, acetylacetonate and oxygen, and d represents an integer of 1 to 4.

The phthalic acid derivative (Compounds A to F) represented by formula (V), as a raw material, is described below.

The soluble group is a substituent of imparting solubility to the phthalocyanine dye. In the case where the soluble group imparts water solubility to the phthalocyanine dye, the soluble group is a hydrophilic group.

Examples of the hydrophilic group include an ionic hydrophilic group and a substituent substituted by an ionic hydrophilic group. Examples of the ionic hydrophilic group include a sulfo group, a carboxyl group, a phosphono group and a quaternary ammonium group. Among these, preferred are a carboxyl group, a phosphono group and a sulfo group, more preferred are a carboxyl group and a sulfo group. The carboxyl group, the phosphono group and the sulfo group each may be in the form of a salt and examples of the counter ion forming the salt include an ammonium ion, an alkali metal ion (e.g., lithium ion, sodium ion, potassium ion) and an organic cation (e.g., tetramethylammonium ion, tetramethylguanidinium ion, tetramethylphosphonium). Among these counter ions, an alkali metal salt is preferred and a lithium salt is more preferred because this salt enhances the solubility of dye and improves the stability of ink).

As for the number of ionic hydrophilic groups, the phthalocyanine compound preferably has two or more ionic hydrophilic-groups within one molecule; more preferably at least two or more sulfo groups and/or carboxyl groups.

The precursor of the soluble group is a substituent which can be converted into a soluble group by a reaction after the formation of a phthalocyanine ring. Examples of this substituent include reactive substituents such as hydroxyl group, halogen atom, mercapto group, amino group, acylamino group, alkoxycarbonyl group, alkenyl group and imido group, and substituents having such a reactive group as a substituent.

In Compounds A to F, X' is preferably a substituent having a Hammett's substituent constant σp value of 0.4 or more. More specifically, this substituent is preferably a hydrophilic group, more preferably —SO—$R_1$, —$SO_2$—$R_1$, —$SO_2NR_2R_3$, —$CONR_2R_3$, —$CO_2$—$R_1$ or CO—$R_1$, still more preferably —$SO_2$—$R_1$ or —$SO_2NR_2R_3$, and most preferably —$SO_2$—$R_1$.

$R_1$ is preferably a substituted or unsubstituted alkyl group, a substituted or unsubstituted aryl group or a substituted or unsubstituted heterocyclic group, most preferably a substituted alkyl group, a substituted aryl group or a substituted heterocyclic group.

$R_2$ is preferably a hydrogen atom, a substituted or unsubstituted alkyl group, a substituted or unsubstituted aryl group or a substituted or unsubstituted heterocyclic group, most preferably a hydrogen atom, a substituted alkyl group, a substituted aryl group or a substituted heterocyclic group.

$R_3$ is preferably a substituted or unsubstituted alkyl group, a substituted or unsubstituted aryl group or a substituted or unsubstituted heterocyclic group, most preferably a substituted alkyl group, a substituted aryl group or a substituted heterocyclic group.

The substituted or unsubstituted alkyl group represented by $R_1$, $R_2$ and $R_3$ is preferably an alkyl group having from 1 to 12 carbon atoms, more preferably a branched alkyl group because the solubility of dye and the stability of ink are improved, and particularly preferably an alkyl group having an asymmetric carbon (use in the racemic from).

Examples of the substituent include those described below as the substituent when $R_1$, $R_2$, $R_3$ and Y can further have a substituent. In particular, a hydroxyl group, an ether group, an ester group, a cyano group, an amido group and a sulfonamido group are preferred because the aggregating property and fastness of dye are enhanced. Other than these, the alkyl group may have a halogen atom or an ionic hydrophilic group.

The substituted or unsubstituted cycloalkyl group represented by $R_1$, $R_2$ and $R_3$ is preferably a cycloalkyl group having from 1 to 12 carbon atoms, more preferably a cycloalkyl group having an asymmetric carbon (use in the racemic from) because the solubility of dye and the stability of ink are improved.

Examples of the substituent include those described below as the substituent when $R_1$, $R_2$, $R_3$ and Y can further have a substituent. In particular, a hydroxyl group, an ether group, an ester group, a cyano group, an amido group and a sulfonamido group are preferred because the aggregating property and fastness of dye are enhanced. Other than these, the cycloalkyl group may have a halogen atom or an ionic hydrophilic group.

The substituted or unsubstituted alkenyl group represented by $R_1$, $R_2$ and $R_3$ is preferably an alkenyl group having from 2 to 12 carbon atoms, more preferably a branched alkenyl group because the solubility of dye and the stability of ink are improved, and particularly preferably an alkenyl group having an asymmetric carbon (use in the racemic from).

Examples of the substituent include those described below as the substituent when $R_1$, $R_2$, $R_3$ and Y can further have a substituent. In particular, a hydroxyl group, an ether group, an ester group, a cyano group, an amido group and a sulfonamido group are preferred because the aggregating property and fastness of dye are enhanced. Other than these, the alkenyl group may have a halogen atom or an ionic hydrophilic group.

The substituted or unsubstituted aralkyl group represented by $R_1$, $R_2$ and $R_3$ is preferably an aralkyl group having from 7 to 18 carbon atoms, more preferably a branched aralkyl group because the solubility of dye and the stability of ink are improved, and particularly preferably an aralkyl group having an asymmetric carbon (use in the racemic from).

Examples of the substituent include those described below as the substituent when $R_1$, $R_2$, $R_3$ and Y can further have a substituent. In particular, a hydroxyl group, an ether group, an ester group, a cyano group, an amido group and a sulfonamido group are preferred because the aggregating property and fastness of dye are enhanced. Other than these, the aralkyl group may have a halogen atom or an ionic hydrophilic group.

The substituted or unsubstituted aryl group represented by $R_1$, $R_2$ and $R_3$ is preferably an aryl group having from 6 to 12 carbon atoms.

Examples of the substituent include those described below as the substituent when $R_1$, $R_2$, $R_3$ and Y can further have a substituent. In particular, an electron-withdrawing group (i.e., electron-attractive group) is preferred because the dye can be positive in the oxidation potential and improved in the fastness. Among these substituents, preferred are a halogen atom, a hetero group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by $R_1$, $R_2$ and $R_3$ is preferably a 5- or 6-membered ring and the rings may further be condensed. Also, the heterocyclic group may be an aromatic heterocyclic group or a non-aromatic hetero-cyclic group.

Examples of the heterocyclic group represented by $R_1$, $R_2$ and $R_3$ are shown below in the form of a heterocyclic ring by omitting the substitution site. The substitution site is not limited and for example, pyridine may be substituted at the 2-position, 3-position and 4-position. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline.

In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benz-isothiazole and thiadiazole.

These groups each may have a substituent and examples of the substituent include those described below as the substituent when $R_1$, $R_2$, $R_3$ and Y can further have a substituent.

Preferred substituents are the same as the above-described substituents of the aryl group and more preferred substituents are the same as the above-described more preferred substituents of the aryl group.

In Compounds A to F, a represents the number of substituent X' and is an integer of 1 to 4. b represents the number of substituent Y and is an integer satisfying the relationship of a+b=4. a is preferably 1 or 2, more preferably 1. When a is 1 or 2, the site to which X' is substituted is preferably 4-position and 5-position in the case of Compounds A, C, D and E, and 5-position and 6-position in the case of Compounds B and F (namely, the position with a mark *, hereinafter called β-position).

In Compounds A to F, Y represents a monovalent substituent. Examples of the monovalent substituent include a hydrogen atom, a halogen atom, an alkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group and an acyl group. These substituents each may further have a substituent.

Among these, preferred are a hydrogen atom, a halogen atom, an alkyl group, an aryl group, a cyano group, an alkoxy group, an amido group, a ureido group, a sulfonamido group, a carbamoyl group, a sulfamoyl group and an alkoxycarbonyl group, more preferred are a hydrogen atom, a halogen atom and a cyano group, and most preferred is a hydrogen atom. The number of carbon atoms in this monovalent substituent is preferably less than 8.

When $R_1$, $R_2$, $R_3$ and Y each is a group which can further have a substituent, the group may further have the following substituent.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each preferably a group having a branched chain because the solubility of dye and the stability of ink are improved, more preferably a group having an asymmetric carbon, such as methyl, ethyl, propyl, isopropyl, sec-butyl, tert-butyl, 2-ethylhexyl, 2-methylsulfonylethyl, 3-phenoxypropyl, trifluoromethyl, cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methane-sulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methane-sulfonamido, benzenesulfonamido, p-toluene-sulfonamido), a carbamoyl group (e.g., N-ethylcarbamoyl, N,N-dibutyl-carbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydro-pyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethyl-silyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxy-propylsulfinyl), a phosphonyl group (e.g., phenoxy-phosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

Among the phthalic acid derivatives (Compounds A to F) represented by formula (V) of the present invention, phthalic acid derivatives (Compounds G to L) having a structure represented by the following formula (VII) are preferred.

Formula (VII):

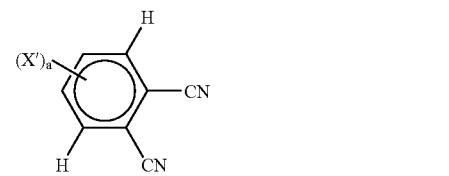

Compound G

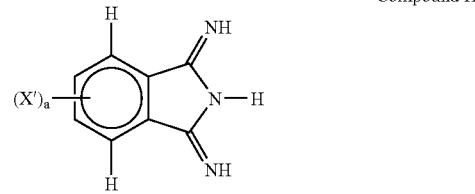

Compound H

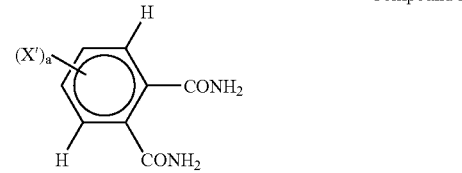

Compound I

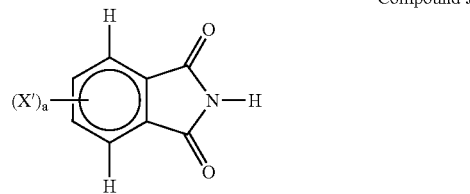

Compound J

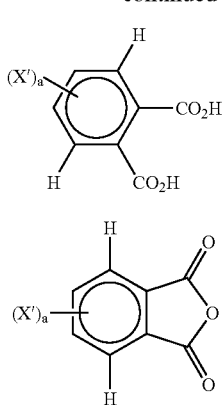

Compound K

Compound L wherein X' represents a substituent selected from the group consisting of —SO—$R_1$, —$SO_2$—$R_1$, —$SO_2NR_2R_3$, —$CONR_2R_3$, —$CO_2$—$R_1$ and CO—$R_1$.

More specifically, X' is preferably —$SO_2$—$R_1$, —$SO_2NR_2R_3$—, —$CONR_2R_3$ or $CO_2$—$R_1$, more preferably —$SO_2$—$R_1$ or —$SO_2NR_2R_3$, and most preferably —$SO_2$—$R_1$.

In Compounds G to L, $R_1$, $R_2$ and $R_3$ each independently has the same meaning as $R_1$, $R_2$ and $R_3$ in preferred substituents of Compounds A to F and preferred examples are also the same.

In Compounds G to L represented by formula (VII), a represents the number of substituent X' and is an integer of 1 or 2, preferably 1.

Specific examples of the phthalic acid derivative as a raw material for use in the present invention are described below.

Specific examples of the substituted phthalonitrile (Compound A) include 4-sulfophthalonitrile, 4-(3-sulfo-propylsulfonyl)phthalonitrile and 4,5-bis(3-sulfopropyl-sulfonyl) phthalonitrile.

Specific examples of the substituted diiminoiso-indoline (Compound B) include 3-amino-1-imino-1H-isoindole-5-sulfonic acid.

Specific examples of the substituted phthalic acid diamide (Compound C) include 4-(4-sulfobutylsulfonyl)-phthalic acid diamide.

Specific examples of the substituted phthalimide (Compound D) include 4-(3-carboxypropylsulfonyl)phthalimide.

Specific examples of the substituted phthalic acid and a salt thereof (Compound E) include trimellitic acid, 4-sulfophthalic acid and 4-(3-sulfopropylsulfonyl)phthalic acid.

Specific examples of the unsubstituted phthalic anhydride (Compound F) include trimellitic anhydride and 4-sulfophthalic anhydride.

The metal derivative {metal derivative represented by formula (VI)} is described below.

 Formula (VI):

wherein M represents a hydrogen atom, a metal atom or an oxide, hydroxide or halide thereof.

Examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi.

Examples of the oxide include VO and GeO.

Examples of the hydroxide include $Si(OH)_2$, $Cr(OH)_2$ and $Sn(OH)_2$.

Examples of the halide include AlCl, $SiCl_2$, VCl, $VCl_2$, VOCl, FeCl, GaCl and ZrCl.

M is preferably Cu, Ni, An or Al and most preferably Cu.

Z represents a monovalent or divalent ligand such as halogen atom, acetate anion, acetylacetonate and oxygen, and d represents an integer of 1 to 4.

In formula (VI), Z represents a monovalent or divalent ligand such as halogen atom, acetate anion, acetylacetonate and oxygen, and d represents an integer of 1 to 4.

Specific examples of the metal derivative {metal derivative represented by formula (VI)} include a halide, a carboxylic acid derivative, a sulfate, a nitrate, a carbonyl compound, an oxide and a complex of Al, Si, Ti, V, Mn, Fe, Co, Ni, Cu, Zn, Ge, Ru, Rh, Pd, In, Sn, Pt and Pb. More specific examples thereof include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride and tin chloride.

[Dye Mixture Represented by Formulae (I) and (II)]

The dye mixture represented by formulae (I) and (II) is described below. The dye mixture represented by formulae (I) and (II) of the present invention include the dye mixture and its salt and hydrate. In the mixture, the salts or hydrates may be used individually or in combination.

In formula (I), M has the same meaning as M in formula (VI) and preferred examples are also the same.

In formula (I), $X_1$, $X_2$, $X_3$ and $X_4$ each independently represents a substituent selected from the group consisting of —SO—$R_1$, —$SO_2$—$R_1$, —$SO_2NR_2R_3$, —$CONR_2R_3$, —$CO_2$—$R_1$ and CO—$R_1$ and at least one substituent represented by $X_1$, at least one substituent represented by $X_2$, at least one substituent represented by $X_3$ and at least one substituent represented by $X_4$ are present in respective rings of four benzene rings {A, B, C and D in formula (II)} of the phthalocyanine nucleus. The dye mixture of the present invention is a dye mixture containing dyes having a plurality of different substituents. The center metal of the phthalocyanine nucleus is the same among dyes.

The substituent is preferably a substituent selected from the group consisting of —SO—$R_1$, —$SO_2$—$R_1$ and —$SO_2NR_2R_3$, more preferably a pair of —$SO_2$—$R_1$ and —$SO_2$—$R_2$ or a pair of —$SO_2$—$R_1$ and —$SO_2NR_2R_3$, still more preferably a pair of —$SO_2$—$R_1$ and —$SO_2$—$R_2$.

The case where $X_1$, $X_2$, $X_3$ and $X_4$ all are the same is excluded and at least one of $X_1$, $X_2$, $X_3$ and $X_4$ has an ionic hydrophilic group as a substituent.

In formula (I), $R_1$, $R_2$ and $R_3$ each independently has the same meaning as $R_1$, $R_2$ and $R_3$ in Compounds A to F represented by formula (V) and preferred examples are also the same.

In formula (I), k, l, m and n represent an integer of 0<k<8, an integer of 0<l<8, an integer of 0≦m<8 and an integer of 0≦n<8.

However, k and/or l and/or m and/or n each independently represents a number satisfying 4≦k+l+m+n≦8.

k, l, m and n are preferably an integer of 0<k<8, an integer of 0<l<8, an integer of 0≦m<8 and n=0, more preferably an integer of 0<k<8, an integer of 0<l<8, and m=n=0, and most preferably an integer of 0<k<4, an integer of 0<l<4 (a number satisfying k+l=4) and m=n=0.

In formula (II), $Y_1$, $Y_2$, $Y_3$, $Y_4$, $Y_5$, $Y_6$, $Y_7$ and $Y_8$ each independently has the same meaning as Y in Compounds A to F represented by formula (V) and preferred examples are also the same.

In formulae (I) and (II), any one of $X_1$, $X_2$, $X_3$, $Y_1$, $Y_2$, $Y_3$, $Y_4$, $Y_5$, $Y_6$, $Y_7$ and $Y_8$ preferably has at least one asymmetric carbon. The asymmetric carbon is preferably introduced into a substituent having no ionic hydrophilic group and the number of asymmetric carbons introduced is from 1 to 16, preferably from 1 to 8, more preferably from 1 to 4.

In the dye mixture of the present invention, the copper phthalocyanine dye mixture prepared from the above-described most preferred phthalic acid derivative where a=1, the soluble group is substituted at the β-position (4-position and 5-position in the case of Compounds A, C, D and E, and 5-position and 6-position in the case of Compounds B and F), Y is a hydrogen atom and M is Cu is, when synthesized, for example, using two different phthalic acid derivatives, represented by the following formula (VIII):

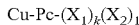  Formula (VIII)

(wherein k+l=4).

In the case of synthesizing the dye mixture using three different phthalic acid derivatives, the dye mixture is represented by the following formula (IX):

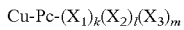  Formula (IX)

(wherein k+l+m=4).

In the case of synthesizing the dye mixture using four different phthalic acid derivatives, the dye mixture is represented by the following formula (X):

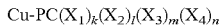  Formula (X)

(wherein k+l+m+n=4).

In formulae (VIII) to (X), Cu-Pc represents a copper phthalocyanine mother nucleus, k, l, m and n each represents a charged ratio (equivalent; equivalent ratio at the reaction) and is a number of 0 or more giving a sum total of 4, and $X_1$, $X_2$, $X_3$ and $X_4$ represent substituents substituted at the β-position and different from each other.

The preferred charged ratio of two or more phthalic acid derivatives (Compounds G to L) different in the soluble group or a precursor thereof, which are used for the production of a copper phthalocyanine dye mixture represented by formulae (VIII) to (X), is described by referring to the case of synthesizing the phthalocyanine dye mixture, for example, using two kinds of phthalic acid derivatives.

Assuming that the equivalent of one phthalic acid derivative is k and the equivalent of another phthalic acid derivative is l, k and l each is preferably a real number satisfying 0<k<4, 0<l<4 and k+l=4.

l, k and l each is more preferably a real number satisfying 0<k≦2, 0<l≦2 and k+l=4, still more preferably a real number satisfying 0<k≦1, 0<l≦3 and k+l=4.

In the case of producing a dye mixture using three kinds of phthalic acid derivatives, assuming that the equivalent of the first phthalic acid derivative is k, the equivalent of the second phthalic acid derivative is l and the equivalent of the third phthalic acid derivative is m, k, l and m each is preferably a real number satisfying. 0<k<4, 0<l<4, 0<m<4 and k+l+m=4.

In the case of producing a dye mixture using four kinds of phthalic acid derivatives, assuming that the equivalent of the first phthalic acid derivative is k, the equivalent of the second phthalic acid derivative is l and the equivalent of the third phthalic acid derivative is m and the equivalent of the fourth phthalic acid derivative is n, k, l, m and n each is preferably a real number satisfying 0<k<4, 0<l<4, 0<m<4, 0<n<4 and k+l+m+n=4.

As for the preferred charging of phthalic acid derivatives (Compounds G to L) different in the soluble group or a precursor thereof, which are used for the production of the copper phthalocyanine dye mixture represented by formulae (VIII) to (X), the dye mixture is preferably synthesized using from two to four kinds of phthalic acid derivatives (Compounds G to L) different in the soluble group or a precursor thereof, more preferably using from two or three kinds of phthalic acid derivatives (Compounds G to L) different in the soluble group or a salt thereof, still more preferably using two kinds of phthalic acid derivatives (Compounds G to L) different in the soluble group or a precursor thereof.

To summarize these, the preferred combination in the dye mixture represented by formulae (I), (II) and (III) is as follows.

(i) $X_1$, $X_2$, $X_3$ and $X_4$ each is independently preferably —SO—$R_1$, —SO$_2$—$R_1$, —SO$_2$NR$_2$R$_3$, —CONR$_2$R$_3$, —CO$_2$—$R_1$ or CO—$R_1$, more preferably —SO$_2$—$R_1$, —SO$_2$NR$_2$R$_3$, —CONR$_2$R$_3$, —CO$_2$—$R_1$ or CO—$R_1$, still more preferably —SO$_2$—$R_1$, or —SO$_2$NR$_2$R$_3$, and most preferably —SO$_2$—$R_1$.

(ii) $R_1$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as the substituent.

(iii) $R_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(iv) $R_3$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as the substituent.

(v) In the phthalic acid derivative as a raw material of the dye mixture of the present invention, a represents the number of substituent X' and is an integer of 1 to 4. Each a is independently preferably 1 or 2, and most preferably 1. When a is 1 or 2, the site to which X' is substituted is preferably 4-position and 5-position in the case of Compounds A, C, D and E, and 5-position and 6-position in the case of Compounds B and F (namely, the position with a mark *, hereinafter called β-position).

(vi) $Y_1$, $Y_2$, $Y_3$, $Y_4$, $Y_5$, $Y_6$, $Y_7$ and $Y_8$ each is independently preferably a hydrogen atom or a halogen atom, and most preferably a hydrogen atom.

(vii) In the phthalic acid derivative as a raw material of the dye mixture of the present invention, b represents the number of substituent Y and is an integer of 1 to 4, preferably 3 or 2, more preferably 3.

(viii) M is preferably Cu, Ni, Zn or Al, most preferably Cu.

(ix) The average molecular weight of the dye mixture of the present invention (the dye mixture has a molecular weight distribution determined by the charged ratio of phthalic acid derivatives) is preferably from 750 to 2,500, more preferably from 995 to 2,500, still more preferably from 995 to 2,000, and most preferably from 995 to 1,800.

(x) The dye mixture represented by formula (I) is preferably represented by formula (IV) and the phthalo-cyanine nucleus represented by formula (II) is preferably represented by formula (III).

Among the dye mixtures represented by formula (I), a dye mixture having at least one ionic hydrophilic group per one unit of the phthalocyanine nucleus is preferred, a dye mixture where the ionic hydrophilic group is a sulfo group is more preferred, and a dye mixture having two or more sulfo groups is most preferred.

The dye mixture represented by formula (I) has at least one ionic hydrophilic group per one unit of the phthalocyanine nucleus and therefore, exhibits good solubility or dispersibility in an aqueous medium.

As for the combination of preferred substituents in the dye mixture represented by formula (I), a compound where at least one of various substituents is the preferred group is preferred, a compound where a larger number of various substituents are the preferred groups is more preferred, and a compound where all substituents are the preferred groups is most preferred.

The dye mixture represented by formula (I) of the present invention is preferably a dye mixture having a structure represented by the following formula (IV).

The dye mixture represented by formula (IV) of the present invention include the dye mixture, and a salt and a hydrate thereof. In the mixture, the salts or hydrates may be used individually or in combination.

Formula (IV):

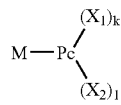

In formula (IV), M, $X_1$ and $X_2$ each independently has the same meaning as M, $X_1$ and $X_2$ in formula (I) and preferred examples are also the same.

In formula (IV), k and l represent an integer of $0<k<8$ and an integer of $0<l<8$.

However, k and/or l each independently represents a number satisfying $4 \leq k+l \leq 8$.

k and l represent an integer of $0<k<8$ and an integer of $0<l<8$ and most preferably represent an integer of $0<k<4$ and an integer of $0<l<4$ (represent a number satisfying $k+l=4$).

To summarize these, the particularly preferred combination in the dye mixture represented by formulae (IV), (II) and (III) is as follows.

(i) $X_1$ and $X_2$ each is independently preferably —SO—$R_1$, —SO$_2$—$R_1$, —SO$_2$NR$_2$R$_3$, —CONR$_2$R$_3$, —CO$_2$—$R_1$ or CO—$R_1$, more preferably —SO$_2$—$R_1$, —SO$_2$NR$_2$R$_3$, —CONR$_2$R$_3$, —CO$_2$—$R_1$ or CO—$R_1$, still more preferably —SO$_2$—$R_1$ or —SO$_2$NR$_2$R$_3$, and most preferably —SO$_2$—$R_1$.

(ii) $R_1$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as the substituent.

(iii) $R_2$ is preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group, and most preferably a hydrogen atom.

(iv) $R_3$ is preferably a substituted or unsubstituted alkyl group, a substituted or unsubstituted aryl group or a substituted or unsubstituted heterocyclic group, more preferably a substituted alkyl group, a substituted aryl group or a substituted heterocyclic group, and most preferably a substituted alkyl group having an ionic hydrophilic group and/or a hydroxyl group as the substituent.

(v) In the phthalic acid derivative as a raw material of the dye mixture of the present invention, a represents the number of substituent X' and is an integer of 1 to 4. Each a is independently preferably 1 or 2, and most preferably 1. When a is 1 or 2, the site to which X' is substituted is preferably 4-position and 5-position in the case of Compounds A, C, D and E, and 5-position and 6-position in the case of Compounds B and F (namely, the position with a mark *, hereinafter called β-position).

(vi) $Y_1$, $Y_2$, $Y_3$, $Y_4$, $Y_5$, $Y_6$, $Y_7$ and $Y_8$ each is independently preferably a hydrogen atom or a halogen atom, and most preferably a hydrogen atom.

(vii) In the phthalic acid derivative as a raw material of the dye mixture of the present invention, b represents the number of substituent Y and is an integer of 1 to 4, preferably 3 or 2, more preferably 3.

(viii) M is preferably Cu, Ni, Zn or Al, most preferably Cu.

(ix) The average molecular weight of the dye mixture of the present invention (the dye mixture has a molecular weight distribution determined by the charged ratio of phthalic acid derivatives) is preferably from 750 to 2,500, more preferably from 995 to 2,500, still more preferably from 995 to 2,000, and most preferably from 995 to 1,800.

Among the dye mixtures represented by formula (IV), a dye mixture having at least one ionic hydrophilic group per one unit of the phthalocyanine nucleus is preferred, a dye mixture where the ionic hydrophilic group is a sulfo group is more preferred, and a dye mixture having two or more sulfo groups is most preferred.

The dye mixture represented by formula (IV) has at least one ionic hydrophilic group per one unit of the phthalocyanine nucleus and therefore, exhibits good solubility or dispersibility in an aqueous medium.

As for the combination of preferred substituents in the dye mixture represented by formula (IV), a compound where at least one of various substituents is the preferred group is preferred, a compound where a larger number of various substituents are the preferred groups is more preferred, and a compound where all substituents are the preferred groups is most preferred.

As for the correlation between the structure and performance of the phthalocyanine compound of the present invention, (1) the oxidation potential of the phthalocyanine compound used in the ink for image formation and (2) the structural feature of the phthalocyanine compound are described one by one.

(1) Oxidation Potential of Phthalocyanine Compound:

In the production method of the phthalocyanine dye mixture of the present invention, when a substituent having a large electron-withdrawing property is selected as the soluble group X' or substituent Y, the oxidation potential of the obtained phthalocyanine dye can be controlled to be high (positive) and the reactivity with active gas (for example, oxidative gas) such as ozone or singlet oxygen can be more suppressed, as a result, a dye having resistance against active gas can be obtained.

As an index for showing this electron-withdrawing property (i.e., electron-attractive property), the Hammett's substituent constant σp value (hereinafter simply referred to as "σp value") can be used. The σp value of the soluble group is preferably 0.40 or more, more preferably 0.45 or more, still more preferably 0.50 or more. However, in the case where the σp value of the soluble group is 0.4 or more, the obtained phthalocyanine compound (including the phthalic acid derivative as a raw material) does not contain a sulfo group or the sulfo group is not directly bonded to the phthalocyanine nucleus (benzene ring structure; in the case of the phthalic acid derivative as a raw material, its benzene ring structure) of the phthalocyanine compound. If the compound has a sulfo group, the sulfo group is always bonded to the phthalocyanine nucleus through a linking group.

In the case where the obtained phthalocyanine compound has a plurality of substituents (including the soluble group) except for hydrogen atom, on the phthalocyanine nucleus (benzene ring structure) in the structure thereof, the sum total of σp values of the substituents (including the soluble group) is preferably 0.50 or more, more preferably 0.55 or more, still more preferably 0.60 or more.

Here, the Hammett's substituent constant σp value is briefly described. The Hammett's rule is a rule of thumb advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these described in detail, for example, in J. A. Dean (compiler) *Lange's Handbook of Chemistry*, 12th ed., McGraw-Hell (1979), and *Kagakuno Ryoiki (Chemistry Region)*, special number, No. 122, pp. 96–103, Nankodo (1979).

As such, by introducing a substituent having a large electron-withdrawing property as the soluble group, a phthalocyanine dye having a positive oxidation potential can be obtained. The oxidation potential is preferably more positive than 1.0 V (vs SCE). A more positive oxidation potential is more preferred and the oxidation potential is more preferably more positive than 1.1 V (vs SCE), most preferably more positive than 1.2 V (vs SCE).

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima, *Denkikagaku Sokutei Ho (Electrochemical Measuring Method)*, Gihodo (1984).

The supporting electrolyte and solvent used for the measurement of the present invention can be appropriately selected according to the oxidation potential or solubility of the sample tested. The supporting electrolyte and solvent which can be used are described in Akira Fujishima, *Denkikagaku Sokutei Ho (Electrochemical Measuring Method)*, pp. 101–118, Gihodo (1984). In the present invention, $1\times10^{-4}$ to $1\times10^{-6}$ mol/liter of a test sample is dissolved in dimethylformamide containing tetrapropylammonium perchlorate as the supporting electrolyte and the value to SCE (saturated calomel electrode) as the reference electrode with carbon (GC) electrode as the acting electrode and platinum electrode as the counter electrode is measured by d.c. polarography and used as the oxidation potential. This value sometimes deviates on the order of tens of millivolt due to the effect of liquid junction potential or liquid resistance of the sample solution but the reproducibility of potential can be guaranteed by adding a standard sample (for example, hydroquinone).

The phthalocyanine dye mixtures of the present invention all have an oxidation potential more positive than 1.0 V (vs SCE) and it has been found that this physical value is very important for improving the fastness of the formed image.

That is, this structural feature (governing the oxidation potential of phthalocyanine dye mixture) is very important for achieving the improvement of preservability of the formed image (light fastness, ozone gas resistance, etc.), which is one of the objects of the present invention.

(2) The phthalocyanine dye mixtures represented by formulae (I) to (IV) of the present invention come under the β-position substitution type (a phthalocyanine compound having specific substituents at the 2- and/or 3-position, 6- and/or 7-position, 10- and/or 11-position, and 14- and/or 15-position) and this is described by referring to the following formula (XI).

The present invention effectively uses an aggregate of a water-soluble dye mixture, derived from the β-position substitution type (a phthalocyanine compound having specific substituents at the 2- and/or 3-position, 6- and/or 7-position, 10- and/or 11-position, and 14- and/or 15-position).

The aggregate of the phthalocyanine dye means an aggregate formed by two or more phthalocyanine molecules.

When the aggregate of the phthalocyanine dye of the present invention is used, stability against light, heat and oxidative gas (particularly ozone gas) is remarkably improved as compared with the dye in the monomolecular dispersion state.

Furthermore, by the formation of an aggregate, the spectral property of the formed image (cyan (color) hue; excellent absorption property as a cyan dye for image-forming materials) is remarkably improved and the paper dependency occurring due to difference in the material on which the image is recorded (for example, plain paper or ink jet special paper) is greatly reduced {good (color) hue (color reproducibility) and improved water resistance; this is brought out because, for example, the difference in the existing state or mordanted state is very small by virtue of the strong aggregate}.

Whether or not the dye is aggregated can be easily determined from the shift of absorption maximum (λmax) in the absorption spectrum as described, for example, in J. D. Wright (translated by Taro Eguchi), *Bunshi Kessho (Molecular Crystal)*, Kagaku Dojin. In general, the aggregate is classified into two aggregates, namely, J-aggregate which shifts to the long wave side, and H-aggregate which shifts to the short wave side. In the present invention, an aggregate is formed by the shifting of the absorption maximum to the short wave side and this aggregate is used as the water-soluble phthalocyanine aggregate.

Therefore, it has been found that the structural feature of the water-soluble phthalocyanine dye of the present invention, that is, the compound where a specific number of specific substituents {—SO—$R_1$ and/or $SO_2$—$R_1$ and/or $SO_2N$—$(R_2)(R_3)$} are introduced into specific sites (β-position substitution type) of the phthalocyanine mother nucleus, is a most preferred structure in view of fastness and color of the formed image because the aggregated state is accelerated.

That is, this structural feature (governing the acceleration of aggregation of the phthalocyanine compound) giving the above-described effect (acceleration of aggregated state) is very important for satisfying (1) to (3): (1) to achieve the improvement of preservability of the formed image, which is one object of the present invention; (2) to form an image having very good spectral property (cyan (color) hue; excellent absorption property as a cyan dye for image-forming materials), which is another object; and (3) to reduce the paper dependency occurring due to difference in the material on which the image is recorded (for example, plain paper or ink jet special paper).

The ozone gas resistance referred to in the present invention is represented by a resistance against ozone gas and includes resistance against oxidative atmospheres other than ozone gas. That is, the phthalocyanine compound represented by formula (I) according to the present invention is characterized by the strong resistance-against oxidative gases present in the general environment, such as nitrogen oxide mostly contained in exhaust gas of automobiles, sulfur oxide mostly contained in exhaust from thermal power stations or factories, ozone gas generated by a radical chain reaction of these gases photochemically caused with solar light, photochemical smog abundant in oxygen-nitrogen or oxygen-hydrogen radical, and hydrogen peroxide radical generated from sites using special chemicals, for example, hair saloon. Accordingly, in the case where the image life is limited by the oxidative deterioration of image, such as outdoor advertisement and guide in railroad facility, the resistance against oxidative atmosphere, namely, ozone gas resistance can be improved by using the phthalocyanine compound of the present invention as the image-forming material.

The conditions for the synthesis between the phthalic acid derivative and the metal derivative in the production method of the dye mixture of the present invention are described in detail below.

The ratio in the amounts of the phthalic acid derivative and the metal derivative used is preferably, in terms of the molar ratio, from 3:1 to 6:1.

The reaction between the phthalic acid derivative and the metal derivative is usually performed in the presence of a solvent. For the solvent, an organic solvent having a boiling point of 80° C. or more, preferably 130° C. or more is used. Examples thereof include n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, diethylene glycol, propylene glycol, ethoxyethanol, propoxyethanol, butoxyethanol, dimethylaminoethanol, diethylaminoethanol, trichlorobenzene, chloronaphthalene, sulfolane, nitrobenzene, quinoline and urea. The amount of the solvent used is preferably from 1 to 100 times in mass (i.e., in weight), more preferably from 5 to 20 times in mass, the phthalic acid derivative.

The reaction of the phthalic acid derivative and the metal derivative may also be performed in the presence of a catalyst. Examples of the catalyst include 1,8-diaza-bicyclo[5.4.0]-7-undecene (DBU) and ammonium molybdate. The amount of the catalyst used is preferably from 0.1 to 10 molar times, more preferably from 0.5 to 2 molar times, per 1 mol of the phthalic acid derivative.

The reaction of the phthalic acid derivative and the metal derivative is preferably performed at a reaction temperature of 80 to 300° C., more preferably from 100 to 250° C., still more preferably from 130 to 230° C. If the reaction temperature is less than 80° C., the reaction rate may become extremely low, whereas if it exceeds 300° C., decomposition of the obtained phthalocyanine dye may occur.

The reaction time is preferably from 2 to 20 hours, more preferably from 5 to 15 hours, still more preferably from 5 to 10 hours. If the reaction time is less than 2 hours, unreacted raw materials may remain in a large amount, whereas if it exceeds 20 hours, decomposition of the obtained phthalocyanine dye may occur.

In the production method of the phthalocyanine dye mixture of the present invention, the product (phthalocyanine dye) obtained by this reaction is treated according to the normal after-treating method in the organic synthesis reaction and then can be used through or not though purification.

More specifically, for example, the product isolated from the reaction system can be used without purifying it or after performing recrystallization or purification by column chromatography (for example, gel permeation chromatography (SEPHADEX™ LH-20, produced by Pharmacia)) or the like or performing these operations in combination.

Also, after the completion of reaction, the reaction solvent is removed or not removed by distillation, the product is charged in water or ice and then neutralized or not neutralized, and the product isolated can be used without purifying it or after performing recrystallization or purification by column chromatography or the like or performing these operations in combination.

Furthermore, after the completion of reaction, the reaction solvent is removed or not removed by distillation, the product is charged in water or ice, neutralized or not neutralized, and then extracted with an organic solvent/an aqueous solution, and the product extracted can be used without purifying it or after performing recrystallization or purification by column chromatography or performing these operations in combination.

In general, it is known to use various phthalocyanine compounds as an ink composition for ink jet recording. The phthalocyanine compound represented by the following formula (XI) sometimes contains an isomer with respect to the substitution site of the substituent $R_n$ (here, $R_1$ to $R_{16}$ are defined as substituents at the 1-position to the 16-position, respectively), which inevitably occurs at the time of synthesis, however, these substitution site isomers are not distinguished from each other but regarded as the same derivative in many cases. Also, in the case where the substituent R contains an isomer, these are not distinguished but regarded as the same phthalocyanine compound in many cases.

Formula (XI):

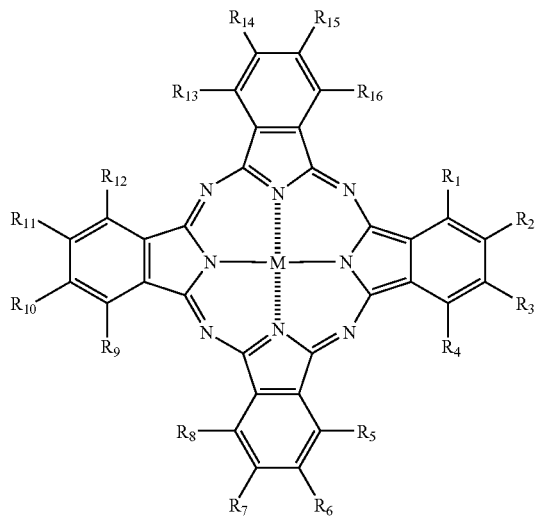

The case where the structure of the phthalocyanine compound is different as defined in the present invention is, when described by referring to formula (XI), any one of the case where the constituent atom species of the substituent $R_n$ (n=1 to 16) is different, the case where the number of substituents Rn is different, and the case where the site of the substituent Rn is different.

In the present invention, derivatives where the structure of the phthalocyanine compound represented by formula (XI) is different (particularly in the substitution site) are defined by classifying these into the following three types.

(1) β-Position Substitution Type:

(a phthalocyanine compound having specific substituents at the 2- and/or 3-position, the 6- and/or 7-position, the 10- and/or 11-position, and the 14- and/or 15-position)

(2) α-Position Substitution Type:

(a phthalocyanine compound having specific substituents at the 1- and/or 4-position, the 5- and/or 8-position, the 9- and/or 12-position, and the 13- and/or 16-position)

(3) α,β-Position Mixed Substitution Type:

(a phthalocyanine compound having specific substitutions at the 1- to 16-position without any regularity)

In the present invention, phthalocyanine compound derivatives different in the structure (particularly in the substitution site) are described by using these (1) β-position substitution type, (2) α-position substitution type and (3) α,β-position mixed substitution type.

The thus-obtained phthalocyanine derivative (for example, when k=l=m=n=1) is usually a mixture of compounds represented by the following formulae (a)-1 to (a)-4 which are isomers different in the site where the substituents $X_1$, $X_2$, $X_3$ and $X_4$ are introduced (the introduced site is commonly the β-position).

Formula (a)-1:

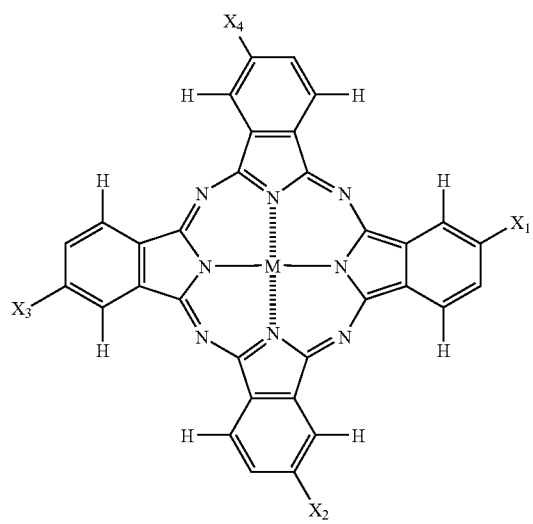

Formula (a)-2:

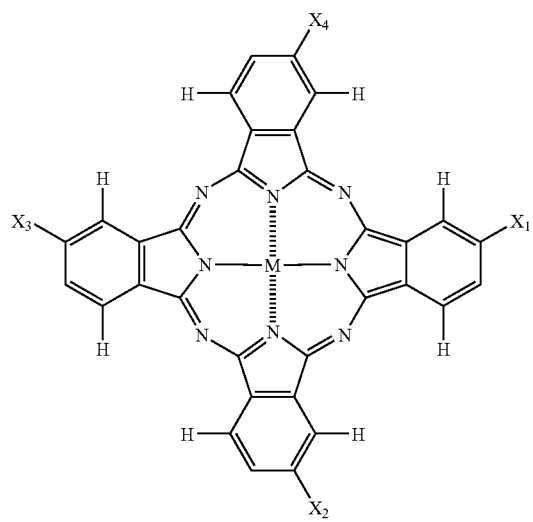

Formula (a)-3:

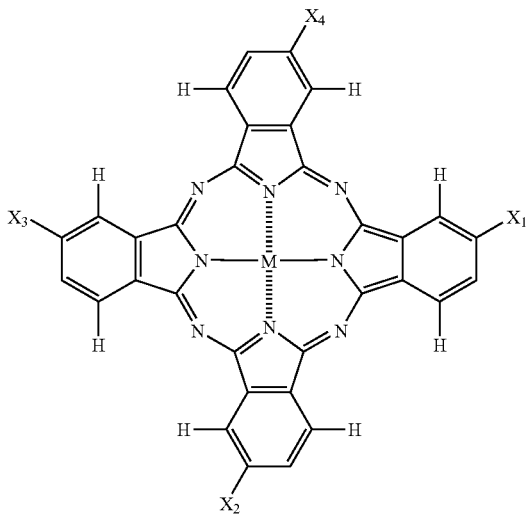

Formula (a)-4:

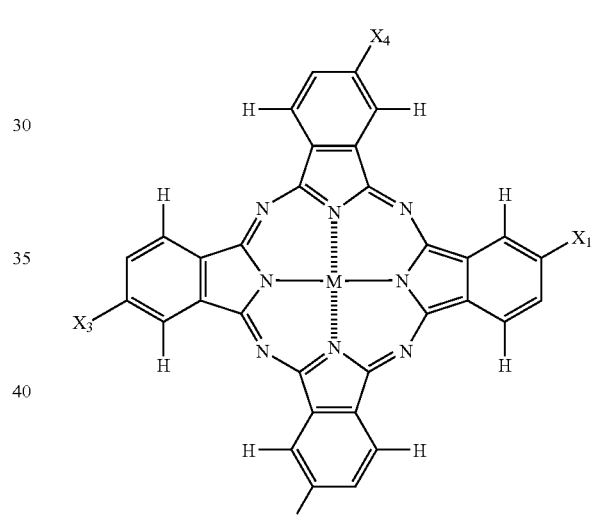

The compounds represented by formulae (a)-1 to (a)-4 are a β-position substitution type compound (a phthalocyanine compound having specific substituents at the 2- and/or 3-position, the 6- and/or 7-position, the 10- and/or 11-position, and the 14- and/or 15-position) and utterly different in the structure (different in the sites where specific substituents are introduced) from the α-position substitution type (a phthalocyanine compound having specific substituents at the 1- and/or 4-position, the 5- and/or 8-position, the 9- and/or 12 position and the 13- and/or 16-position) and the α,β-position mixed substitution type (a phthalocyanine compound having specific substituents at the 1- to 16-position without any regularity). This structural feature is very important for achieving the objects of the present invention.

The cause of enabling to attain the objects of the present invention is not particularly known but derivatives where a soluble group is introduced into the β-position are mostly by far superior to others in the (color) hue, light fastness, ozone gas resistance and the like.

More specifically, it is considered that the phthalo-cyanine compound of the present invention which has (1) good spectral absorption property (the aggregated state of phthalocyanine compounds is accelerated by the introduction of specific soluble groups at the β-position), (2) high image fastness (high oxidation potential and acceleration of strong aggregated state prevent, for example, discoloration due to oxidation reaction between the phthalocyanine compound and ozone gas as an electrophilic reagent) and (3) high solubility in the ink composition and (4) imparts good aging stability to the ink solution, can be achieved by selectively introducing a specific number of specific soluble groups to specific substitution sites (β-position), in other words, by enabling the formation of a strong aggregate of high oxidation potential and perfect β-position substitution type phthalocyanine compounds and the selective introduction of an objective number of specific soluble groups.

In this case, it is preferred in view of synthesis that the soluble group X is a substituent having a high electron-withdrawing property and Y is a hydrogen atom.

The effect of improving (color) hue, light fastness, ozone gas resistance and the like and imparting required property to the coloring composition (ink), which is brought by the structural feature due to these specific substituents, cannot be anticipated at all from the above-described conventional techniques.

Specific examples of dye of the present invention are set forth below, however, the present invention is not limited to these examples.

In Tables 1 to 9 below, formula (XII) represents a (k+1)-valent phthalocyanine nucleus (the introduction site of substituent R is the β-position substitution type defined in the present invention), wherein R represents $R_1$ and/or $R_2$, t represents a value of $0<t \leq 2$, k represents a value of $0<k<8$, and l represents a value of $0<l<8$, provided that k and l each independently represents a number satisfying $4 \leq k+l \leq 8$.

Formula (XII):

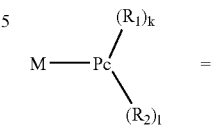

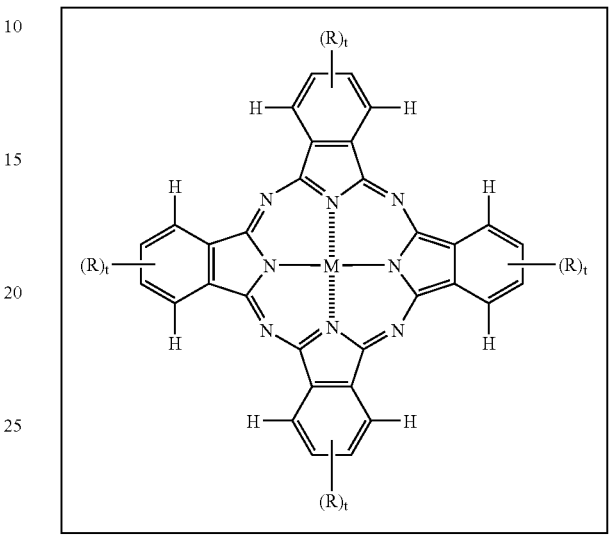

In Tables, the substituents ($R_1$) and ($R_2$) each is introduced in an irregular site order within the β-position substitution (isomers represented by formulae (a)-1 to (a)-4 are shown). The values of k and l show the charged ratio eq./eq.) of phthalonitrile derivatives used at the synthesis of a phthalocyanine derivative.

TABLE 1

| Dye | M | $R_1$ | k | $R_2$ | l |
|---|---|---|---|---|---|
| 101 | Cu | —SO—(CH$_2$)$_3$—SO$_3$K | 3 | —SO$_2$—(CH$_2$)$_3$—SO$_2$NH—C$_2$H$_4$OC$_2$H$_4$OH | 1 |
| 102 | Cu | —SO$_2$—(CH$_2$)$_3$—SO$_3$K | 2 | —SO$_2$—(CH$_2$)$_3$—SO$_2$NH—C$_2$H$_4$OC$_2$H$_4$OH | 2 |
| 103 | Cu | —SO$_2$—(CH$_2$)$_3$—SO$_3$Li | 3 | —SO$_2$—(CH$_2$)$_3$—SO$_2$NH—CH$_2$CHCH$_3$ \| OH | 1 |
| 104 | Cu | —SO$_2$—(CH$_2$)$_3$—SO$_3$Li | 2.7 | —SO$_2$—(CH$_2$)$_3$—SO$_2$NH—CH$_2$CHCH$_3$ \| OH | 1.3 |
| 105 | Cu | —SO$_2$—(CH$_2$)$_3$—SO$_3$Li | 2 | —SO$_2$—(CH$_2$)$_3$—SO$_2$NH—CH$_2$CHCH$_3$ \| OH | 2 |

TABLE 2

| Dye | M | $R_1$ | k | $R_2$ | l |
|---|---|---|---|---|---|
| 106 | Cu | —SO$_2$—(CH$_2$)$_3$—SO$_3$Li | 3.33 | —SO$_2$—(CH$_2$)$_3$—SO$_2$NH—CH$_2$CHCH$_3$ \| OH | 0.67 |
| 107 | Cu | —SO$_2$—(CH$_2$)$_3$—SO$_3$Li | 3.50 | —SO$_2$—(CH$_2$)$_3$—SO$_2$NH—CH$_2$CHCH$_3$ \| OH | 0.50 |

TABLE 2-continued

| Dye | M | R₁ | k | R₂ | l |
|---|---|---|---|---|---|
| 108 | Cu | $-SO_2-(CH_2)_3-SO_3Li$ | 3 | $-SO_2-(CH_2)_3-SO_2NH-CHCH_2OH$ with $CH_3$ branch | 1 |
| 109 | Cu | $-SO_2-(CH_2)_3-SO_3Li$ | 3 | $-SO_2-(CH_2)_3-SO_2NH-CH_2CHCH_2OH$ with $OH$ branch | 1 |
| 110 | Cu | $-SO_2-(CH_2)_3-SO_3Li$ | 3 | $-SO_2-(CH_2)_3-SO_2N(C_2H_4OH)_2$ | 1 |

TABLE 3

| Dye | M | R₁ | k | R₂ | l |
|---|---|---|---|---|---|
| 111 | Cu | $-SO_2-(CH_2)_4-SO_3Li$ | 3 | $-SO-(CH_2)_3-SO_2NH-C_2H_4OC_2H_4OH$ | 1 |
| 112 | Cu | $-SO_2-CH_2CH_2CH(CH_3)-SO_3Li$ | 3 | $-SO-(CH_2)_3-SO_2NH-C_2H_4OC_2H_4OH$ | 1 |
| 113 | Cu | $-SO_2-(CH_2)_3-CO_2Li$ | 3 | $-SO_2-(CH_2)_3-SO_2NH-CH_2CHCH_3$ with $OH$ branch | 1 |
| 114 | Cu | $-SO_2-(CH_2)_3-CO_2Li$ | 2 | $-SO_2-(CH_2)_3-SO_2NH-CH_2CHCH_3$ with $OH$ branch | 2 |
| 115 | Cu | $-SO_2-(CH_2)_5-CO_2Li$ | 3 | $-SO_2-(CH_2)_3-SO_2NH-CH_2CHCH_3$ with $OH$ branch | 1 |

TABLE 4

| Dye | M | R₁ | k | R₂ | l |
|---|---|---|---|---|---|
| 116 | Cu | $-SO_2-(C_2H_4O)-C_2H_4SO_3Li$ | 3 | $-SO_2-(CH_2)_3-SO_2NH-CH_2CHCH_3$ with $OH$ branch | 1 |
| 117 | Cu | $-SO_2-(C_2H_4O)_2-C_2H_4SO_3Li$ | 3 | $-SO_2(CH_2)_3SO_2NHCHCH_2OH$ with $CH_3$ branch | 1 |
| 118 | Cu | $-SO_2-(C_2H_4O)_3-C_2H_4SO_3Li$ | 2 | $-SO_2-(CH_2)_3-SO_2NH-CH_2CHCH_2OH$ with $OH$ branch | 2 |
| 119 | Cu | $-SO_2-(CH_2)_3-SO_3Li$ | 2 | $-SO_2-(C_2H_4O)_2-C_2H_4OH$ | 2 |
| 120 | Cu | $-SO_2-(CH_2)_3-SO_3Li$ | 2 | $-SO_2-(C_2H_4O)_2-C_2H_4OCH_3$ | 2 |

TABLE 5

| Dye | M | R₁ | k | R₂ | l |
|---|---|---|---|---|---|
| 121 | Cu | $-SO_2-(CH_2)_3-SO_3K$ | 1 | $-SO_2-CH_2CH_2CH(CH_3)-SO_3K$ | 3 |
| 122 | Cu | $-SO_2-(CH_2)_3-SO_3Li$ | 3 | $-SO_2-(CH_2)_3-CO_2Li$ | 1 |
| 123 | Cu | $-SO_2-(CH_2)_3-SO_3Li$ | 3 | $-SO_2-(CH_2)_3-CO_2Li$ | 1 |

TABLE 5-continued

| Dye | M | R₁ | k | R₂ | l |
|---|---|---|---|---|---|
| 124 | Cu | —SO$_2$—(CH$_2$)$_3$—SO$_3$Li | 1 | —SO$_2$—(CH$_2$)$_3$—SO$_2$NH—CH$_2$CH(OH)CH$_2$SO$_3$Li | 3 |
| 125 | Cu | —SO$_2$—CH$_2$CH$_2$CH(CH$_3$)—SO$_3$Li | 3 | —SO$_2$—(CH$_2$)$_3$—SO$_2$NH—CH$_2$CH(OH)CH$_2$CO$_2$Li | 1 |

TABLE 6

| Dye | M | R₁ | k | R₂ | l |
|---|---|---|---|---|---|
| 126 | Cu | —SO$_2$—(CH$_2$)$_3$—SO$_3$Li | 1 | —SO$_2$—(CH$_2$)$_3$—SO$_2$NH—CH$_2$CH(OH)CH$_2$SO$_3$Li | 3 |
| 127 | Ni | —SO$_2$—(CH$_2$)$_4$—SO$_3$Li | 1 | —SO$_2$—(CH$_2$)$_3$—SO$_2$NH—CH$_2$CH(OH)CH$_2$SO$_3$Li | 3 |
| 128 | Zn | —SO$_2$—CH$_2$CH$_2$CH(CH$_3$)—SO$_3$Li | 1 | —SO$_2$—(CH$_2$)$_3$—SO$_2$NH—CH$_2$CH(OH)CH$_2$SO$_3$Li | 3 |
| 129 | Cu | —SO$_2$—CH$_2$CH$_2$CH(CH$_3$)—SO$_3$Li | 1 | —SO$_2$—(CH$_2$)$_3$—SO$_2$NH—CH$_2$CH(OH)CH$_2$CO$_2$Li | 3 |
| 130 | Cu | —SO$_2$—(CH$_2$)$_3$—SO$_2$NH—CH$_2$CH(OH)CH$_2$SO$_3$Li | 2 | —SO$_2$—(CH$_2$)$_3$—SO$_2$NH—CH$_2$CH(OH)CH$_2$CO$_2$Li | 2 |

TABLE 7

| Dye | M | R₁ | k | R₂ | l |
|---|---|---|---|---|---|
| 131 | Cu | —SO$_2$—(CH$_2$)$_3$—SO$_3$Li | 3 | 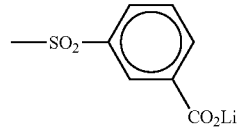 | 1 |
| 132 | Cu | —SO$_2$—(CH$_2$)$_3$—SO$_3$Li | 2 |  | 2 |
| 133 | Cu | 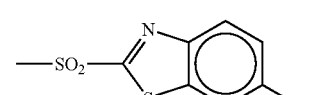 | 1 |  | 3 |
| 134 | Cu | —SO$_2$—CH$_2$CH$_2$CH(CH$_3$)—SO$_3$Li | 3 | 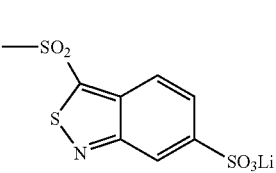 | 1 |
| 135 | Cu | 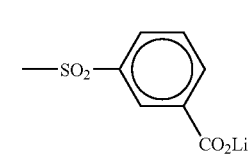 | 2 |  | 2 |

TABLE 8

| Dye | M | $R_1$ | k | $R_2$ | l |
|---|---|---|---|---|---|
| 136 | Cu | —$SO_2NH_2$—$(CH_2)_2$—$SO_3K$ | 3 | —$SO_2NH$—$(CH_2)_3$—$N(C_2H_4SO_3K)_2$ | 1 |
| 137 | Cu | —$SO_2NH_2$—$(CH_2)_3$—$SO_3Li$ | 3 | —$SO_2NH$—$(CH_2)_3$—$N(C_2H_4OH)_2$ | 1 |
| 138 | Cu | —$SO_2NH$—C$_6$H$_4$—$SO_3Li$ (phenyl) | 3 | —$SO_2NH_2$—$C_2H_4OC_2H_4OH$ | 1 |
| 139 | Cu | —$SO_2NH$—(benzisothiazole-$SO_3Li$) | 3 | —$SO_2NH_2$—$CH_2CHCH_3$ with OH | 1 |
| 140 | Cu | —$SO_2$—$(CH_2)_3$—$SO_3Li$ | 3 | —$SO_2NH_2$—$CH_2CHCH_2OH$ with OH | 1 |

TABLE 9

| Dye | M | $R_1$ | k | $R_2$ | l |
|---|---|---|---|---|---|
| 141 | Cu | —$SO_2$—$(CH_2)_3$—$SO_3Li$ | 3 | —CONH—$C_2H_4OC_2H_4OH$ | 1 |
| 142 | Cu | —$SO_2$—$(CH_2)_3$—$SO_3Li$ | 2.4 | —CONH—C$_6$H$_4$—$SO_3Li$ (phenyl) | 1.6 |
| 143 | Cu | —$SO_2$—$(CH_2)_3$—$SO_3Li$ | 3 | —$CO_2$—$C_2H_4OC_2H_4OC_2H_4SO_3Li$ | 1 |
| 144 | Cu | —$SO_2$—$CH_2CH_2CH(CH_3)$—$SO_3Li$ | 3 | —CO—$CH_3$ | 1 |
| 145 | Cu | —$SO_2NH$—$C_2H_4OC_2H_4OC_2H_4SO_3Na$ | 3 | —CONH—$(C_2H_4O)_2C_2H_4SO_3Na$ | 1 |

In Table 10, formula (XIII) represents a (k+l+m)-valent phthalocyanine nucleus (the introduction site of substituent R is the β-position substitution type defined in the present invention), wherein R represents $R_1$ and/or $R_2$ and/or $R_3$, t represents an integer of 1 or 2, k represents an integer of 0<k<8, l represents an integer of 0<l<8, and m represents an integer of 0<m<8, provided that k, l and m each independently represents a number satisfying 4≦k+l+m≦8.

Formula (XIII):

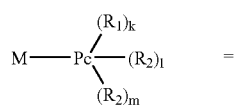

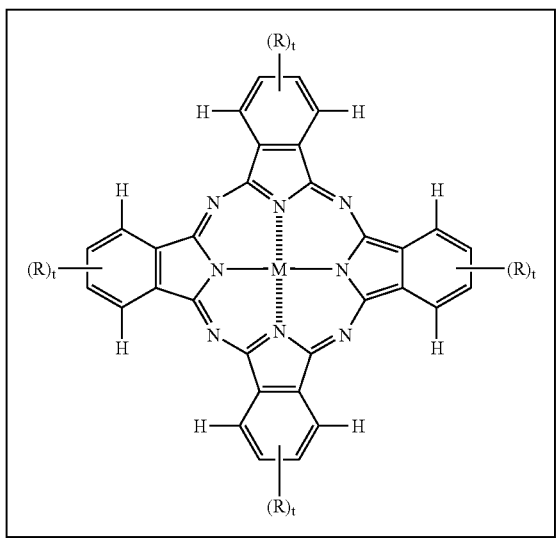

In the Table, the substituents ($R_1$), ($R_2$) and ($R_3$) each is introduced in an irregular site order within the β-position substitution (isomers represented by formulae (a)-1 to (a)-4 are shown). The values of k, l and m show the charged ratio (eq./eq./eq.) of phthalonitrile derivatives used at the synthesis of a phthalocyanine derivative.

In Table 11, formula (XIV) represents a (k+l+m+n)-valent phthalocyanine nucleus (the introduction site of substituent R is the β-position substitution type defined in the present invention), wherein R represents $R_1$ and/or $R_2$ and/or $R_3$ and/or $R_4$, t represents an integer of 1 or 2, k represents an integer of 0<k<8, l represents an integer of 0<l<8, m represents an integer of 0<m<8, and n represents an integer of 0<n<8, provided that k, l, m and n each independently represents a number satisfying $4 \leq k+l+m+n \leq 8$.

Formula (XIV):

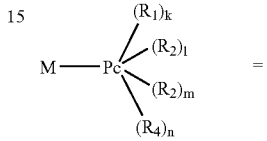

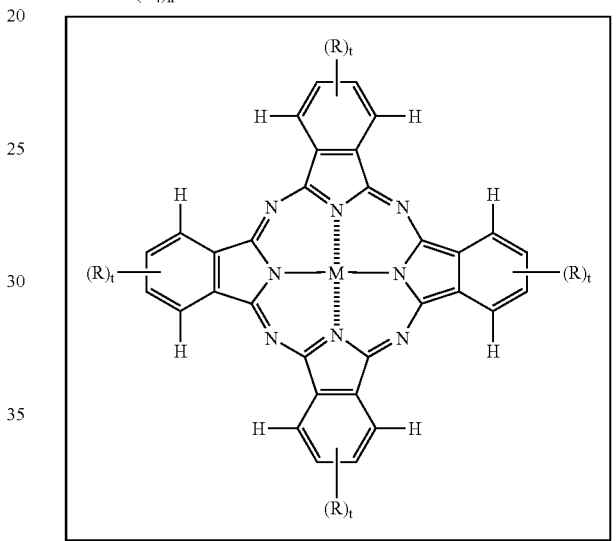

TABLE 10

| Dye | M | $R_1$ | k | $R_2$ | l | $R_3$ | m |
|---|---|---|---|---|---|---|---|
| 146 | Cu | —SO$_2$(CH$_2$)$_3$SO$_3$Li | 2 | —SO$_2$(CH$_2$)$_3$SO$_2$NHCH$_2$CHCH$_3$<br>\|<br>OH | 1 | —SO$_2$(CH$_2$)$_3$SO$_2$NHCHCH$_2$OH<br>\|<br>CH$_3$ | 1 |
| 147 | Ni | —SO$_2$(CH$_2$)$_3$SO$_3$Li | 1 | —SO$_2$(CH$_2$)$_5$CO$_2$Li | 1 | —SO$_2$(CH$_2$)$_3$SO$_2$NHCHCH$_2$OH<br>\|<br>CH$_3$ | 2 |
| 148 | Cu | —SO$_2$(CH$_2$)$_3$SO$_3$K | 1.5 | —SO$_2$—C$_6$H$_4$—CO$_2$K | 0.5 | —SO$_2$(CH$_2$)$_3$SO$_2$NHC$_2$H$_4$OC$_2$H$_4$OH | 2 |
| 149 | Cu | —SO$_2$(CH$_2$)$_3$SO$_3$Li | 2 | —SO$_2$—(CH$_2$)$_3$—SO$_2$NH—CHCH$_2$OH<br>\|<br>CH$_3$ | 1 | —SO$_2$(CH$_2$)$_3$SO$_2$NHCHCH$_2$OH<br>\|<br>CH$_3$ | 1 |
| 150 | Zn | —SO$_2$(CH$_2$)$_3$SO$_3$Li | 2 | —SO$_2$—(CH$_2$)$_3$—SO$_2$NH—CHCH$_2$OH<br>\|<br>CH$_3$ | 1 | —SO$_2$(CH$_2$)$_3$SO$_2$NHCHCH$_2$OH<br>\|<br>CH$_3$ | 1 |

In the Table, the substituents ($R_1$), ($R_2$), ($R_3$) and ($R_4$) each is introduced in an irregular site order within the β-position substitution (isomers represented by formulae (a)-1 to (a)-4 are shown). The values of k, l, m and n show the charged ratio (eq./eq./eq./eq.) of phthalonitrile derivatives used at the synthesis of a phthalocyanine derivative.

TABLE 11

| Dye | M | $R_1$ | k | $R_2$ | l | $R_3$ | m | $R_4$ | n |
|---|---|---|---|---|---|---|---|---|---|
| 151 | Cu | —SO$_2$(CH$_2$)$_3$SO$_3$Na | 1 | —SO$_2$(CH$_2$)$_3$CO$_2$Na | 1 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 152 | Cu | —SO$_2$(CH$_2$)$_3$SO$_3$NH$_4$ | 1 | —SO$_2$(CH$_2$)$_3$CO$_2$NH$_4$ | 1 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 153 | Cu | —SO$_2$(CH$_2$)$_3$SO$_3$K | 1 | —SO$_2$(CH$_2$)$_3$CO$_2$K | 1 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 154 | Cu | —SO$_2$(CH$_2$)$_3$SO$_3$Li | 1 | —SO$_2$(CH$_2$)$_3$CO$_2$Li | 1 | —SO$_2$(CH$_2$)$_3$SO$_2$NHCH$_2$CH(OH)CH$_3$ | 1 | —SO$_2$(CH$_2$)$_3$SO$_2$NHCH(CH$_3$)CH$_2$OH | 1 |
| 155 | Cu | —SO$_2$(CH$_2$)$_3$SO$_3$K | 1 | —SO$_2$(CH$_2$)$_3$SO$_3$K | 1 | —SO$_2$(CH$_2$)$_3$SO$_2$NHCH$_2$CH(OH)CH$_2$OH | 1 | —SO$_2$NHCH$_2$CH(OH)CH$_2$OH | 1 |

Phthalocyanine derivatives conventionally used are a mixture of isomers different in the site to which a specific substituent is introduced (depending on the case, the number of sites to which introduced). The compound (the compounds represented by formulae (I), (II), (III) and (IV); a phthalocyanine derivative having a specific structure where a specific number of specific substituents are selectively introduced into specific sites) of the present invention is a novel compound having a specific structure which has not been heretofore isolated and recognized. By virtue of the performance brought out from the specific structure, this compound is very useful as a dye for ink jetting imparted with high functionality or as an intermediate for the synthesis of the dye.

Examples of the use of the dye mixture of the present invention include a coloring composition (a material for forming an image, particularly a color image, such as ink and coating material) containing a medium and the dye mixture. Specific examples thereof include a recording material (ink) for ink jet recording, a heat-sensitive transfer-type image recording material, a pressure-sensitive recording material, a recording material using the electrophotographic system, a transfer-type silver halide light-sensitive material, a printing ink and a recording pen. Among these, preferred are a recording material (ink) for ink jet recording, a heat-sensitive transfer-type image recording material and a recording material using the electrophotographic system, more preferred is a recording material (ink) for ink jet recording. The dye mixture of the present invention can also be applied to a dyeing solution for dyeing a color filter or various fibers used in solid image pick-up devices such as LCD and CCD described in U.S. Pat. No. 4,808,501 and JP-A-6-35182. The phthalocyanine compound of the present invention can be adjusted to have physical properties suitable for use, such as solubility and heat transfer, by the substituent.

[Ink for Ink Jet Recording]

The ink for ink jet recording of the present invention is described below.

The ink for ink jet recording can be produced by dissolving and/or dispersing the above-described phthalocyanine dye mixture in a lipophilic or aqueous medium. Preferably, an aqueous medium is used.

If desired, other additives are contained within the range of not impairing the effect of the present invention.

Examples of other additives include known additives such as drying inhibitor (wetting agent), discoloration inhibitor, emulsification stabilizer, permeation accelerator, ultraviolet absorbent, antiseptic, fungicide, pH adjusting agent, surface tension adjusting agent, defoaming agent, viscosity controlling agent, dispersant, dispersion stabilizer, rust inhibitor and chelating agent. These various additives are directly added to the ink solution in the case of a water-soluble ink. When an oil-soluble dye is used in the form of a dispersion, the additives are generally added to the dispersion after the preparation of a dye dispersion but may be added to the oil or aqueous phase at the preparation.

The drying inhibitor is suitably used for the purpose of preventing occurrence of clogging due to drying of the ink for ink jetting at the ink jetting port of a nozzle used for the ink jet recording system.

The drying inhibitor is preferably a water-soluble organic solvent having a vapor pressure lower than water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylol-propane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. The drying inhibitor is preferably contained in the ink in an amount of 10 to 50 wt %.

The permeation accelerator is suitably used for the purpose of obtaining good permeation of the ink for ink jetting into paper. Examples of the permeation accelerator which can be used include alcohols such as ethanol, isopropanol, butanol, di(tri)ethylene glycol monobutyl ether and 1,2-hexanediol, sodium laurylsulfate, sodium oleate and non-ionic surfactants. A sufficiently high effect can be obtained by adding from 5 to 30 wt % of the permeation accelerator to the ink and the permeation accelerator is preferably used within the amount range of causing no blurring of printed letter or no print through.

The ultraviolet absorbent is used for the purpose of improving the preservability of image. Examples of the ultraviolet absorbent which can be used include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a published Japanese translation of a PCT patent application"), compounds described in Research Disclosure No. 24239, and compounds of absorbing ultraviolet light and emitting fluorescent light, so-called fluorescent brightening agents represented by stilbene-base compound and benzoxazole-base compound.

The discoloration inhibitor is used for the purpose of improving the preservability of image. Examples of the discoloration inhibitor which can be used include various organic discoloration inhibitors and metal complex-base discoloration inhibitors. Examples of the organic discoloration inhibitor include hydroquinones, alkoxy-phenols, dialkoxyphenols, phenols, anilines, amines, indanes, chromans, alkoxyanilines and heterocyclic rings. Examples of the metal complex include nickel complex and zinc complex. More specifically, compounds described in patents cited in Research Disclosure, Nos. 17643 (Items VII-I to VII-J), 15162, 18716 (page 650, left column) 36544 (page 527), 307105 (page 872) and 15162, and compounds included in formulae of representative compounds and in exemplary compounds described in JP-A-62-215272 (pages 127 to 137) can be used.

Examples of the fungicide include sodium dehydro-acetate, sodium benzoate, sodium pyridinethione-1-oxide, ethyl p-hydroxybenzoate, 1,2-benzisothiazolin-3-one and salts thereof. The fungicide is preferably used in the ink in an amount of 0.02 to 1.00 wt %.

As the pH adjusting agent, the above-described neutralizer (e.g., organic base, inorganic alkali) can be used. The pH adjusting agent is used for the purpose of improving the storage stability of the ink for ink jet recording and is preferably added to adjust the ink for ink jet recording to a pH of 6 to 10, more preferably to a pH of 7 to 10.

The surface tension adjusting agent includes nonionic, cationic and anionic surfactants. Here, the surface tension of the ink for ink jetting of the present invention is preferably from 25 to 70 mN/m, more preferably from 25 to 60 mN/m. Also, the viscosity of the ink for ink jet recording of the present invention is preferably 30 mPa·s or less, more preferably 20 mPa·s or less. Preferred examples of the surfactant include anionic surfactants such as fatty acid salt, alkylsulfuric ester salt, alkylbenzene-sulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which is an acetylene-base polyoxyethylene oxide surfactant, is preferably used. In addition, amine oxide-type amphoteric surfactants such as N,N-dimethyl-N-alkylamine oxide are preferred. Furthermore, surfactants described in JP-A-59-157636 (pages (0.37) to (38)) and Research Disclosure, No. 308119 (1989) can be used.

As the defoaming agent, for example, a chelating agent represented by the fluorine- or silicon-containing compound and EDTA can also be used, if desired.

In the case of dispersing the phthalocyanine compound of the present invention in an aqueous medium, a colored fine particle containing the dye and an oil-soluble polymer is preferably dispersed in an aqueous medium as described in JP-A-11-286637, JP-A-2001-240763, JP-A-2001-262039, and JP-A-2001-247788 or the compound of the present invention dissolved in a high boiling point organic solvent is preferably dispersed in an aqueous medium as described in JP-A-2001-262018, JP-A-240763, JP-A-2001-335734 and JP-A-2002-80772. With respect to the specific method for dispersing the compound of the present invention in an aqueous medium, the oil-soluble polymer, high boiling point organic solvent and additives used, and the amounts thereof, those described in the above patent publications can be preferably used. Also, the phthalocyanine compound, which is solid, can be dispersed as it is in a fine particle state. At the dispersion, a dispersant or a surfactant can be used. As for the dispersing device, a simple stirrer, an impeller stirring system, an in-line stirring system, a mill system (e.g., colloid mill, ball mill, sand mill, attritor, roll mill, agitator mill), an ultrasonic wave system and a high-pressure emulsification dispersion system (high-pressure homogenizer and as the commercially available device, specific examples thereof include Gaulin Homogenizer, Microfluidizer and DeBEE 2000) can be used. The preparation method of the ink for ink jet recording is described in detail, in addition to the above patent publications, in JP-A-5-148436, JP-A-5-295312, JP-A-7-97541, JP-A-7-82515, JP-A-7-118584, JP-A-11-286637 and JP-A-2001-271003 and the contents described in these patent publications can be used also for the preparation of the ink for ink jet recording of the present invention.

As the aqueous medium, a mixture comprising water as the main component and a water-miscible organic solvent added, if desired, can be used. Examples of the water-miscible organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol, monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethyl-propylenediamine) and other polar solvents (e.g., formamide, N,N-dimethylformamide, N,N-dimethylacetamide, dimethyl-sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In 100 parts by weight of the ink of the present invention, from 0.1 to 20 parts by weight of the phthalocyanine compound is preferably contained. Furthermore, in the ink for ink jetting of the present invention, other dye may be used in combination with the phthalocyanine compound. In the case of using two or more dyes in combination, the total content of the dyes is preferably in the above-described range.

The ink of the present invention preferably has a viscosity of 40 cp or less and a surface tension of 20 to 70 mN/m. The viscosity and surface tension can be adjusted by adding various additives such as viscosity adjusting agent, surface tension controlling agent, resistivity controlling agent, film controlling agent, ultraviolet absorbent, antioxidant, discoloration inhibitor, antiseptic, rust inhibitor, dispersant and surfactant.

The ink of the present invention can be used not only for the formation of a monochromatic image but also for the formation of a full color image. For forming a full color image, a magenta color tone ink, a cyan color tone ink and a yellow color tone ink can be used. Also, for adjusting the color tone, a black color tone ink may be further used.

As for the yellow dye which can be used, any yellow dye may be used. Examples thereof include aryl- or heteryl-azo dyes having a phenol, a naphthol, an aniline, a heterocyclic ring (e.g., pyrazolone, pyridone), an open chain-type active methylene compound or the like as the coupling component (hereinafter referred to as "coupler component"); azomethine dyes having an open chain-type active methylene compound or the like as the coupler component; methine dyes such as benzylidene dye and monomethine oxonol dye; and quinone-base dyes such as naphthoquinone dye and anthraquinone dye. Other examples of the dye species include quinophthalone dye, nitro-nitroso dye, acridine dye and acridinone dye.

As for the magenta dye which can be used, any magenta dye may be used. Examples thereof include aryl- or heteryl-azo dyes having a phenol, a naphthol or an aniline as the coupler component; azomethine dyes having a pyrazolone or a pyrazolotriazole as the coupler component; methine dyes such as arylidene dye, styryl dye, merocyanine dye, cyanine dye and oxonol dye; carbonium dyes such as diphenylmethane dye, triphenylmethane dye and xanthene dye; quinone dyes such as naphthoquinone, anthraquinone and anthrapyridone; and condensed polycyclic dyes such as dioxazine dye.

As for the cyan dye which can be used, any cyan dye may be used. Examples thereof include aryl- or heteryl-azo dyes having a phenol, a naphthol or an aniline as the coupler component; azomethine dyes having a phenol, a naphthol or a heterocyclic ring (e.g., pyrrolotriazole) as the coupler component; polymethine dyes such as cyanine dye, oxonol dye and merocyanine dye; carbonium dyes such as diphenylmethane dye, triphenylmethane dye and xanthene dye; phthalocyanine dyes; anthraquinone dyes; and indigo-thioindigo dyes.

These dyes may be a dye which provides a yellow, magenta or cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation as a partial structure.

Examples of the black coloring material which can be used include dis-azo, tris-azo and tetra-azo dyes and a dispersion of carbon black.

[Ink Jet Recording Method]

According to the ink jet recording method of the present invention, an energy is provided to the ink and thereby an image is formed on a known image-receiving material, namely, plain paper, resin coated paper, ink jet special paper described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, film, electrophotographic common paper, cloth, glass, metal, ceramic or the like.

In forming an image, a polymer fine particle dispersion (also called polymer latex) may be used in combination for the purpose of giving glossiness or water resistance or improving the weather resistance. The timing of imparting the polymer latex to the image-receiving material may be before or after imparting the coloring agent or simultaneously with it. Accordingly, the site to which the polymer latex is added may be in the image-receiving paper or ink, or a liquid material composed of the polymer latex alone may be prepared and used. More specifically, the methods described in JP-A-2002-166638, JP-A-2002-121440, JP-A-2002-154201, JP-A-2002-144696, JP-A-2002-80759, JP-A-2002-187342 and JP-A-2002-172774 can be preferably used.

The recording paper and recording film used in the ink jet printing using the ink of the present invention are described below.

The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, additives such as conventionally known pigment, binder, sizing agent, fixing agent, cation agent and paper strength increasing agent and then sheeting the mixture using various devices such as Fourdrinier paper machine and cylinder paper machine. Other than this support, synthetic paper or plastic film may be used. The thickness of the support is preferably from 10 to 250 μm and the basis weight is preferably from 10 to 250 g/m$^2$.

An ink-accepting layer and a backcoat layer may be provided on the support as it is or may be provided after providing a size press or anchor coat layer using starch, polyvinyl alcohol and the like. The support may also be subjected to a flattening treatment by a calendering device such as machine calender, TG calender and soft calender. In the present invention, the support is preferably paper or plastic film of which both surfaces are laminated with polyolefin (for example, polyethylene, polystyrene, polyethylene terephthalate, polybutene or a copolymer thereof).

In the polyolefin, a white pigment (for example, titanium oxide or zinc oxide) or a tinting dye (for example, cobalt blue, ultramarine or neodymium oxide) is preferably added.

The ink-accepting layer provided on the support contains a pigment and an aqueous binder. The pigment is preferably a white pigment. Examples of the white pigment include a white inorganic pigment such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and an organic pigment such as styrene-base pigment, acryl-base pigment, urea resin and melamine resin. The white pigment contained in the ink-accepting layer is preferably a porous inorganic pigment, more preferably a synthetic amorphous silica having a large pore area. The synthetic amorphous silica may be either a silicic acid anhydride obtained by a dry production method or a silicic acid hydrate obtained by a wet production method but is preferably a silicic acid hydrate.

Examples of the aqueous binder contained in the ink-accepting layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in view of adhesion property to the pigment and peeling resistance of the ink-accepting layer.

The ink-accepting layer may contain a mordant, a water-proofing agent, a light fastness enhancer, a surfactant and other additives in addition to the pigment and the aqueous binder.

The mordant added to the ink-accepting layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, light fastness of the image is improved.

The water-proofing agent is effective for water-proofing the image. The water-proofing agent is preferably a cationic resin. Examples of the cationic resin include polyamidopolyamine epichlorohydrin, polyethyleneimine, polyaminesulfone, poly-dimethyldiallylammonium chloride, cation polyacrylamide and colloidal silica. Among these cationic resins, polyamidopolyamine epichlorohydrin is preferred. The content of the cationic resin is preferably from 1 to 15 wt %, more preferably from 3 to 10 wt %, based on the entire solid content of the ink-accepting layer.

Examples of the light fastness enhancer include zinc sulfate, zinc oxide, hindered amine-base antioxidants and benzophenone-base or benzotriazole-base ultraviolet absorbents. Among these, zinc sulfate is preferred.

The surfactant functions as a coating aid, a peeling property improver, a sliding property improver or an antistatic agent. The surfactant is described in JP-A-62-173463 and JP-A-62-183457. In place of the surfactant, an organic fluoro compound may be used. The organic fluoro compound is preferably hydrophobic. Examples of the organic fluoro compound include a fluorine-containing surfactant, an oily fluorine-base compound (for example, fluorine oil) and a solid fluorine compound resin (for example, ethylene tetrafluoride resin). The organic fluoro compound is described in JP-B-57-9053 (columns 8 to 17), JP-A-61-20994 and JP-A-62-135826. Other additives added to the ink-accepting layer include a pigment dispersant, a thickener, a defoaming agent, a dye, a fluorescent brightening agent, an antiseptic, a pH adjusting agent, a matting agent, a hardening agent and the like. The ink-accepting layer may be either one layer or two layers.

In the recording paper or film, a backcoat layer may also be provided. Examples of the component which can be added to this layer include a white pigment, an aqueous binder and other components. Examples of the white pigment contained in the backcoat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other components contained in the backcoat layer include a defoaming agent, a foam inhibitor, a dye, a fluorescent brightening agent, an antiseptic, a water-proofing agent and the like.

A polymer latex may be added to a constituent layer (including the backcoat layer) of the ink jet recording paper or film. The polymer latex is used for the purpose of improving film properties, for example, stabilizing the dimension and preventing the curling, adhesion or film cracking. The polymer latex is described in JP-A-62-245258, JP-A-62-1316648 and JP-A-62-110066. When a polymer latex having a low glass transition temperature (40° C. or less) is added to a layer containing the mordant, the layer can be prevented from cracking or curling. Also, by adding a polymer latex having a high glass transition temperature to the backcoat layer, curling can be prevented.

The ink of the present invention is not limited on the ink jet recording system and is used for a known system, for example, an electric charge controlling system of jetting out the ink by using the electrostatic induction force, a drop-on-demand system (pressure pulse system) of using an oscillation pressure of a piezoelectric device, an acoustic ink jet system of converting electric signals into acoustic beams, irradiating the beams on the ink and jetting out the ink using the radiation pressure, or a thermal ink jet system of heating the ink to form bubbles and utilizing the generated pressure. The ink jet recording system includes a system of ejecting a large number of small volumes of so-called photo-ink having a low concentration, a system designed to improve the image quality by using a plurality of inks each having substantially the same (color) hue but a different concentration, and a system of using colorless transparent ink.

EXAMPLES

Synthesis Example

The synthesis method of the dye mixture of the present invention is described in detail below by referring to Examples, however, the present invention is not limited to these Examples. In Examples, the temperature is in the centigrade scale.

A representative dye mixture of the present invention can be derived, for example, through the following synthesis route. In the following Examples, λmax means an absorption maximum wavelength and εmax means a molar absorption coefficient at the absorption maximum wavelength.

Dye mixtures of the present invention synthesized in the following Examples (Synthesis Examples 9 to 15) were measured on the oxidation potential under the following conditions. In N,N-dimethylformamide (dye concentration: 0.001 mol dm$^{-3}$) containing 0.1 mol dm$^{-3}$ tetrapropylammonium perchlorate as the supporting electrode, the oxidation potential was measured by d.c. polarography using a graphite electrode by means of POLAROGRAPHIC ANALYZER P-100. The measured oxidation potential value (vs SCE) of phthalocyanine dye mixture is shown in the following Examples (Examples 9 to 15).

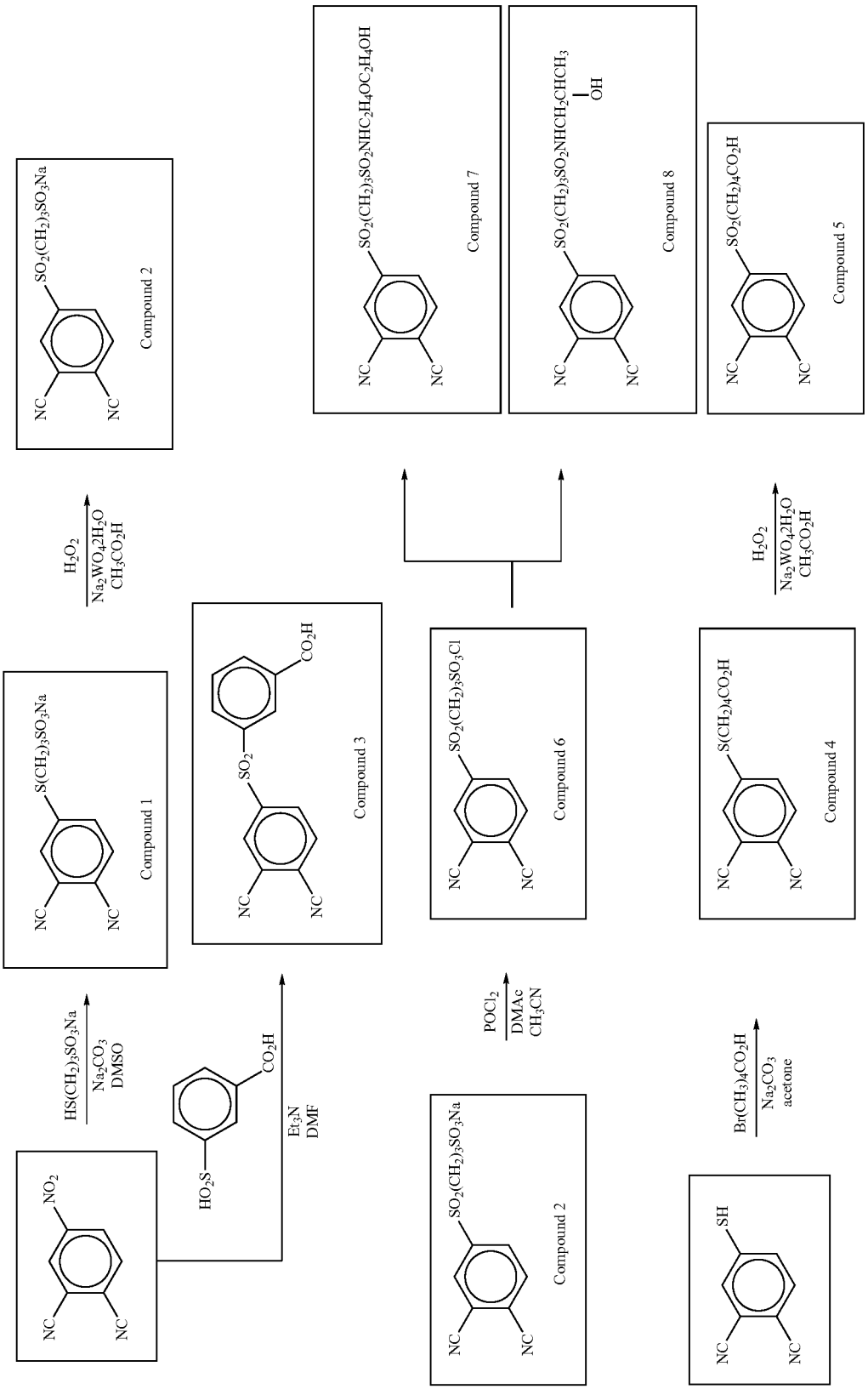

Synthesis Example 1

Synthesis of Compound 1

26.0 g of 4-nitrophthalonitrile (produced by Tokyo Kasei) was dissolved in 200 mL of DMSO (dimethylsulfoxide) in a nitrogen stream and to the obtained solution under stirring at an inner temperature of 20° C., 30.3 g of sodium 3-mercapto-propane-sulfonate (produced by Aldrich) was added. To the resulting solution under stirring at an inner temperature of 20° C., 24.4 g of anhydrous sodium carbonate was gradually added. Subsequently, the reaction solution was heated to 30° C. while stirring and then stirred at the same temperature for 1 hour. After cooling to 20° C., the reaction solution was filtered by Nutsche, the filtrate was crystallized by pouring it in 15,000 mL of ethyl acetate and then stirred at room temperature for 30 minutes, and the precipitated crude crystals were filtered by Nutsche, washed with ethyl acetate and dried. The obtained crude crystals were recrystallized from methanol/ethyl acetate to obtain 42.5 g of Compound 1. $^1$H-NMR (DMSO-d6), δ value TMS standard: 1.9–2.0 (2H, t); 2.5–2.6 (2H, m); 3.2–3.3 (2H, t); 7.75–7.85 (1H, d); 7.93–8.03 (1H, d); 8.05–8.13 (1H, s).

Synthesis Example 2

Synthesis of Compound 2

42.4 g of Compound 1 was dissolved in 300 mL of acetic acid and to the obtained solution under stirring at an inner temperature of 20° C., 2.5 g of $Na_2WO_4 \cdot 2H_2O$ was added. Thereafter, the solution was cooled to an inner temperature of 10° C. in ice bath. Thereto, 35 mL of aqueous hydrogen peroxide (30%) was gradually added dropwise while caring about heat generation. After stirring at an inner temperature of 15 to 20° C. for 30 minutes, the reaction solution was heated to an inner temperature of 60° C. and then stirred at the same temperature for 1 hour. After cooling to 20° C., 1,500 mL of ethyl acetate was poured into the reaction solution, the solution was stirred at the same temperature for 30 minutes, and the precipitated crude crystals were filtered by Nutsche, washed with 200 mL of ethyl acetate and dried. The obtained crude crystals were washed under heat using methanol/ethyl acetate and thereby purified to obtain 41.0 g of Compound 2. $^1$H-NMR (DMSO-d6), δ value TMS standard: 1.8–1.9 (2H, t); 2.4–2.5 (2H, m); 3.6–3.7 (2H, t); 8.3–8.4 (1H, d); 8.4–8.5 (1H, d); 8.6–8.7 (1H, s).

Synthesis Example 3

Synthesis of Compound 3

26.0 g of 4-nitrophthalonitrile was dissolved in 200 mL of DMF (dimethylformamide) in a nitrogen stream and to the obtained solution under stirring at an inner temperature of 20° C., 29.3 g of 3-carboxybenzenesulfinic acid was added and then 42 mL of triethylamine was gradually added. Subsequently, the reaction solution was heated to 80° C. while stirring and then stirred at the same temperature for 1 hour. After cooling to 20° C., the reaction solution was crystallized by pouring it in 1,000 mL of water having added thereto 35 mL of hydro-chloric acid and the precipitated crude crystals were filtered by Nutsche, washed with water and dried. The obtained crude crystals were recrystallized from methanol/ethyl acetate to obtain 33.2 g of Compound 3 (4-(3-carboxyphenylsulfonyl)phthalonitrile). $^1$H-NMR (DMSO-d6), δ value TMS standard: 7.8–7.9 (1H, t); 8.25–8.3 (1H, d); 8.3–8.4 (2H, m); 8.5–8.55 (2H, dd); 8.85–8.95 (1H, d); 13.6–13.8 (1H, b).

Synthesis Example 4

Synthesis of Compound 4

16.0 g of 4-mercaptophthalonitrile was dissolved in 100 mL of DMF (dimethylformamide) and 400 mL of acetone in a nitrogen stream and to the obtained solution under stirring at an inner temperature of 20° C., 21.5 g of 6-bromohexanoic acid (produced by Wako Pure Chemical Industries, Ltd.) was added. To the resulting solution under stirring at an inner temperature of 20° C., 15.2 g of anhydrous sodium carbonate was gradually added. Subsequently, the reaction solution was heated to a reflux temperature while stirring and then stirred at the same temperature for 1 hour. After cooling to 20° C., the reaction solution was filtered by Nutsche and washed with 100 mL of acetone. The filtration residue was poured in 2,000 mL of water and after filtering insoluble matters, the filtrate was crystallized by injecting concentrated hydrochloric acid (until the aqueous solution became acidic) and then stirred at room temperature for 30 minutes. The precipitated crude crystals were filtered by Nutsche, washed with water and dried. The obtained crude crystals were recrystallized from acetonitrile to obtain 23.1 g of Compound 4. $^1$H-NMR (DMSO-$d_6$), δ value TMS standard: 1.4–1.7 (6H, m); 2.2–2.3 (2H, t); 3.1–3.2 (2H, t); 7.7–7.8 (1H, d); 7.90–7.95 (1H, d); 7.95–8.0 (1H, s); 11.9–12.0 (1H, s).

Synthesis Example 5

Synthesis of Compound 5

19.2 g of Compound 4 was dissolved in 200 mL of acetic acid and to the obtained solution under stirring at an inner temperature of 20° C., 1.0 g of $Na_2WO_4 \cdot 2H_2O$ was added. Thereafter, the solution was cooled to an inner temperature of 10° C. in ice bath. Thereto, 15.9 mL of aqueous hydrogen peroxide (30%) was gradually added dropwise while caring about heat generation. After stirring at an inner temperature of 15 to 20° C. for 30 minutes, the reaction solution was heated to an inner temperature of 60° C. and then stirred at the same temperature for 1.5 hours. After cooling to 20° C., 1,000 mL of water was poured into the reaction solution, the solution was stirred at the same temperature for 30 minutes, and the precipitated crude crystals were filtered by Nutsche, washed with 200 mL of water and dried to obtain 20.2 g of Compound 5. $^1$H-NMR (DMSO-d6), δ value TMS standard: 1.3–1.6 (6H, m); 2.15–2.25 (2H, t); 3.5–3.6 (2H, t); 8.35–8.5 (2H, m); 8.6–8.7 (1H, s); 11.95–12.0 (1H, s).

Synthesis Example 6

Synthesis of Compound 6

67.2 g of Compound 2 was dissolved in 150 mL of DMAc (dimethylacetamide) and 1,000 mL of acetonitrile and to the obtained solution under stirring at an inner temperature of 20° C., 38.0 mL of phosphorus oxychloride was gradually added dropwise while caring about heat generation. Thereafter, the reaction solution was heated to an inner temperature of 70° C. and then stirred at the same temperature for 2 hours. After cooling to 20° C., the reaction solution was poured into 3,000 mL of ice water and then stirred at 15° C. for 30 minutes, and the precipitated crude crystals were filtered by Nutsche and washed with 5,000 mL of water. The obtained crude crystals were taken out and washed with 500 mL of isopropyl alcohol and the crystals were filtered by Nutsche, washed with 200 mL of isopropyl alcohol and dried under reduced pressure to obtain 52.2 g of Compound 6. $^1$H-NMR (DMSO-d6), δ value TMS standard: 1.8–1.9 (2H, m); 2.5–2.6 (2H, t); 3.6–3.7 (2H, t); 8.4–8.5 (2H, dd); 8.6–8.7 (1H, s).

Synthesis Example 7

Synthesis of Compound 7

3.2 g of 2-(2-aminoethoxy)ethanol (produced by Wako Pure Chemical Industries, Ltd.) was dissolved in 50 mL of acetonitrile and to the resulting solution under stirring at an inner temperature of 5° C., 5.0 g of Compound 6 was gradually added while taking care not to elevate the inner temperature over 10° C. and then the solution was stirred at room temperature for 1 hour. The reaction solution was subjected to liquid separation by adding 18 mL of brine and extracted. The acetonitrile layer was dried over magnesium sulfate and collected by filtration and the filtrate was concentrated by a rotary evaporator to obtain 5.8 g of an oily product. The product was purified by silica gel column chromatography (methanol/CH$_2$Cl$_2$=1/10, v/v), as a result, 4.4 g of Compound 7 was obtained. $^1$H-NMR (DMSO-d6), δ value TMS standard: 1.8–2.0 (2H, m); 3.0–3.1 (2H, m); 3.1–3.2 (2H, t); 3.4–3.6 (6H, m); 3.6–3.7 (2H, t); 4.6–4.7 (1H, t); 7.2–7.3 (1H, t); 8.35–8.45 (2H, dd); 8.65–8.7 (1H, s).

Synthesis Example 8

Synthesis of Compound 8

5.64 g of 1-amino-2-propanol (produced by Wako Pure Chemical Industries, Ltd.) was dissolved in 50 mL of DMAc (dimethylacetamide) and to the resulting solution under stirring at an inner temperature of 4° C., 10.0 g of Compound 6 was gradually added while taking care not to elevate the inner temperature over 12° C. and the solution was stirred at room temperature for 1 hour. The reaction solution was added to a mixed solution of 150 mL of 1N-hydrochloric acid and 150 g of ice. The precipitated solid was collected by filtration and thoroughly washed with water. The obtained crude crystals were recrystallized from acetone to obtain 6.3 g of Compound 8. $^1$H-NMR (DMSO-d6), δ value TMS standard: 1.0–1.1 (3H, d); 1.8–2.0 (2H, m); 2.7–2.9 (2H, t); 3.0–3.2 (2H, t); 3.5–3.7 (4H, m); 4.7–4.8 (1H, d); 7.1–7.2 (1H, t); 8.3–8.5 (2H, dd); 8.6–8.7 (1H, s).

Synthesis Example 9

Synthesis of Compound 102 of the Present Invention

In a three-neck flask with a condenser tube, 4.4 g of compound 7 and 3.7 g of Compound 2 were dissolved in 45 mL of ethylene glycol at 80° C. in a nitrogen stream. While stirring, 1.42 g of cupric chloride (anhydride) was added at the same temperature and after elevating the inner temperature to 120° C., the solution was stirred at the same temperature for 2 hours, and then the inner temperature was lowered to 60° C. Thereafter, 200 mL of methanol was gradually poured and then the solution was refluxed for 30 minutes. The inner temperature was lowered to room temperature and the precipitate was collected by filtration and washed with 150 mL of methanol. The obtained crude crystals were dissolved in 150 mL of an aqueous 0.1N KOH solution, insoluble matters were separated by filtration, the resulting solution was heated to an inner temperature of 60° C. and into the solution, 50 mL of dimethylacetamide (DMAc) was poured. While keeping the inner temperature at 80° C., 200 mL of methanol was gradually added and then the solution was refluxed for 30 minutes. After lowering the inner temperature to room temperature, the precipitate was filtered and washed with heated methanol. This operation (addition of methanol to an aqueous potassium hydroxide solution of the compound, and reprecipitation) was repeated twice. As a result, 6.5 g of Compound 102 was obtained. The compound was identified by the following method. Using mass spectrometry {device: LC/MS (Model TSQ-7000, LC: Model HP-1090); LC column (TSK-gelODS80Ts, 2×150 mm, detection: 580(±)20 nm & MCD); eluent and flow rate (water/methanol, 0.1% acetic acid/triethylamine buffer, 0.2 mL/min); LC/MS ionization; ESI-negative}, the distribution determined by the charged ratio of phthalic acid derivatives used at the synthesis of the phthalocyanine compound was analyzed from the peak of LC chromatogram and the MS spectrum. The obtained compound (reaction mixture) was confirmed as the objective phthalocyanine compound of the present invention where the soluble groups are different in the kind and the bonded site (a reaction mixture having a normal distribution such that the distribution maximum is present when the charged ratio of phthalic acid derivatives is, in the case of Compound 102, 2 eq./2 eq.). λmax=617.6 nm; εmax=50,800 (in H$_2$O); Eox=1.26 V (vs SCE).

Synthesis Example 10

Synthesis of Compound 103 of the Present Invention

In a three-neck flask with a condenser tube, 4.0 g of Compound 8 and 10.9 g of Compound 2 were dissolved in 50 mL of ethylene glycol at 80° C. in a nitrogen stream. While stirring, 1.45 g of cupric chloride (anhydride) was added at the same time and after elevating the inner temperature to 120° C., the solution was stirred at the same temperature for 2 hours and then cooled to an inner temperature of 60° C. Thereafter, 150 mL of methanol was gradually poured and then the solution was refluxed for 30 minutes. The inner temperature was lowered to room temperature and the precipitate was collected by filtration and washed with 150 mL of methanol. The obtained crude crystals were dissolved in 150 mL of water, insoluble matters were separated by filtration, the solution was heated to an inner temperature of 60° C. and thereinto, 15.7 g of lithium hydroxide was poured. While keeping the inner temperature at 80° C., 200 mL of ethanol was gradually added and then the solution was refluxed for 30 minutes. The inner temperature was lowered to room temperature and the precipitate was filtered and washed with heated ethanol. This operation (addition of lithium hydroxide to an aqueous solution of the compound, and reprecipitation with ethanol) was repeated three times in total to obtain 5.12 g of Compound 103. The compound was identified by the following method. Using mass spectrometry {device: LC/MS (Model TSQ-7000, LC: Model HP-1090); LC column (TSK-gelODS80Ts, 2×150 mm, detection: 580(±)20 nm & MCD); eluent and flow rate (water/methanol, 0.1% acetic acid/triethylamine buffer, 0.2 mL/min); LC/MS ionization; ESI-negative}, the distribution determined by the charged ratio of phthalic acid derivatives used at the synthesis of the phthalocyanine compound was analyzed from the peak of LC chromatogram and the MS spectrum. The obtained compound (reaction mixture) was confirmed as the objective phthalocyanine compound of the present invention where the soluble groups are different in the kind and the bonded site (a reaction mixture having a normal distribution such that the distribution maximum is present when the charged ratio of phthalic acid derivatives is, in the case of Compound 103, 1 eq./3 eq.). λmax=624.6 nm; εmax=59,100 (in $H_2O$); Eox=1.23 V (vs SCE).

Synthesis Example 11

Synthesis of Compound 106 of the Present Invention

Compound 106 was synthesized by the same operation as in the synthesis of Compound 103 except that the charged ratio of Compound 8/Compound 2 in the synthesis of Compound 103 was changed to 1/5 (eq/eq). λmax=626.2 nm; εmax=61,500 (in $H_2O$); Eox=1.17 V (vs SCE).

Synthesis Example 12

Synthesis of Compound 107 of the Present Invention

Compound 107 was synthesized by the same operation as in the synthesis of Compound 104 except that the charged ratio of Compound 8/Compound 2 in the synthesis of Compound 103 was changed to 1/7 (eq/eq). λmax=627.2 nm; εmax=63,500 (in $H_2O$); Eox=1.18 V (vs SCE).

Synthesis Example 13

Synthesis of Compound 115 of the Present Invention

Compound 115 was synthesized by the same operation as in the synthesis of Compound 103 except that Compound 5 was used in place of Compound 2 in the synthesis of Compound 103. λmax=621.4 nm; εmax=54,500 (in $H_2O$); Eox=1.26 V (vs SCE).

Synthesis Example 14

Synthesis of Compound 123 of the Present Invention

Compound 123 was synthesized by the same operation as in the synthesis of Compound 103 except that Compound 5 was used in place of Compound 8 in the synthesis of Compound 103. λmax=628.8 nm; εmax=63,300 (in $H_2O$); Eox=1.26 V (vs SCE).

Synthesis Example 15

Synthesis of Compound 131 of the Present Invention

Compound 131 was synthesized by the same operation as in the synthesis of Compound 104 except that Compound 3 was used in place of Compound 8 in the synthesis of Compound 103. λmax=628.0 nm; εmax=54,100 (in $H_2O$); Eox=1.36 V (vs SCE).

Example 1

Deionized water was added to the following components to make 1 liter and the resulting solution was stirred for 1 hour under heating at 30 to 40° C. Thereafter, the solution was adjusted to a pH of 9 with 10 mol/L of KOH and then filtered under pressure through a microfilter having an average pore size of 0.25 μm to prepare an ink solution for cyan color.

| Composition of Ink Solution A: | |
| --- | --- |
| Dye mixture of the Present Invention (Compound 103) | 6.80 g |
| Diethylene glycol | 10.65 g |
| Glycerin | 14.70 g |
| Diethylene glycol monobutyl ether | 12.70 g |
| Triethanolamine | 0.65 g |
| ORFIN E1010 | 0.9 g |

Ink Solutions B to E were prepared in the same manner as Ink Solution A except for changing the dye mixture as shown in Table 12 below. As the ink solution for comparison, Comparative Ink Solutions 101, 102 and 103 were prepared in the same manner using the following compounds.

Comparative Compound 1

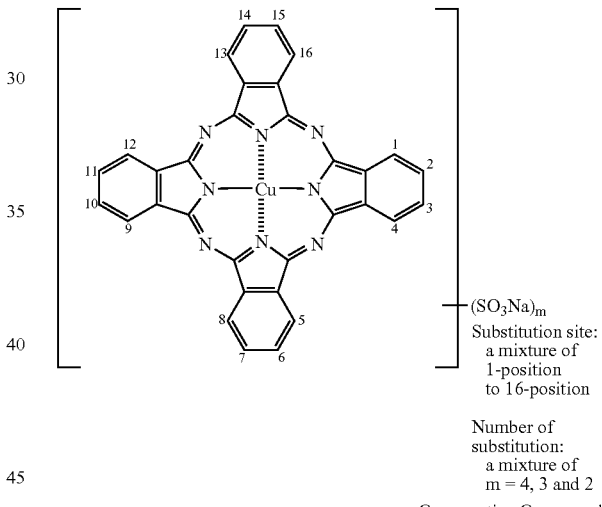

$-(SO_3Na)_m$
Substitution site:
a mixture of
1-position
to 16-position

Number of substitution:
a mixture of
m = 4, 3 and 2

Comparative Compound 2

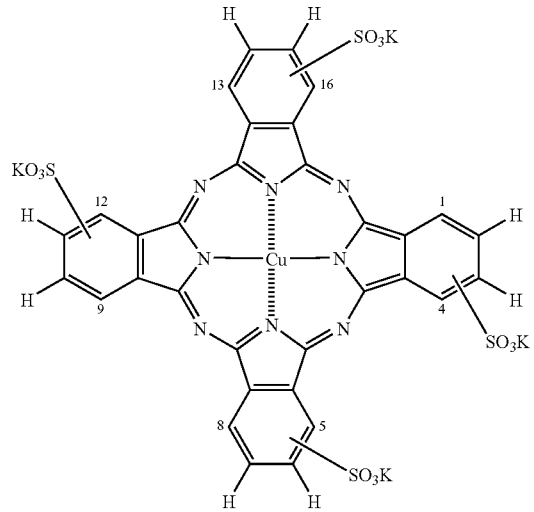

-continued

Comparative Compound 3

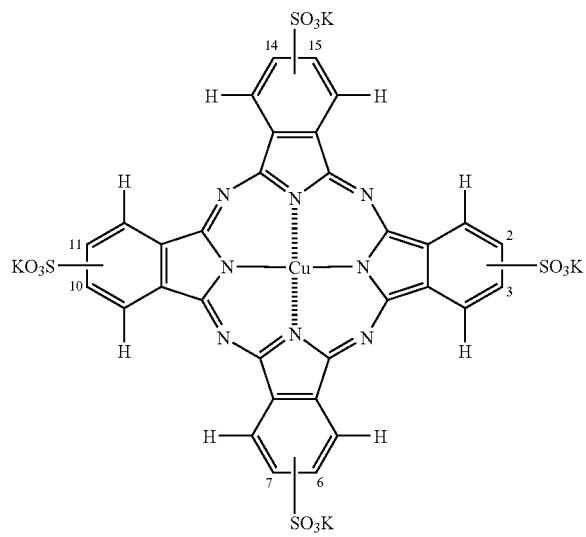

In changing, the dye was used such that the amount added thereof became equimolar to the dye used in Ink Solution A. In using two or more dyes in combination, these were used each in an equimolar amount.

(Recording and Evaluation of Image)

Each ink for ink jetting of Examples (Ink Solutions A to E) and Comparative Examples (Ink Solutions 101 to 103) was subjected to the following evaluations. The results obtained are shown in Table 12.

In Table 12, "color tone", "paper dependency", "water resistance" and "light fastness" were evaluated after an image was recorded using each ink for ink jetting on a photo gloss paper (PM Photographic Paper "KOTAKU" (KA420PSK, EPSON), produced by EPSON) in an ink jet printer (PM-700C, manufactured by EPSON).

<Color Tone>

The image formed on the photo gloss paper was subjected to colorimetry of the reflection spectrum at intervals of 10 nm in the region from 390 to 730 nm using GRETAG SPM100-II (manufactured by GRETAG) and a* and b* were calculated based on the CIE (International Commission on Illumination) L*a*b* color space system.

By comparing with the standard cyan color sample (a color when solid batches of proof provided from 21 companies as members of the Japan Printing Machinery Manufacturers Association were subjected to colorimetry and the printing was performed using Japan Color Ink SF-90 and Japan Paper to give a smallest color difference (ΔE) from the average value) of JAPAN Color of JNC (Japan Printing Machinery Manufacturers Association), the preferred cyan color tone was defined as follows:

L*: in the range of 53.6±0.2,

○: a* (in the range of −35.9±6) and b* (in the range of −50.4±6)

Δ: only one of a* and b* (in the preferred region defined in ○ above)

X: neither a* nor b* (both out of the preferred region defined in ○ above)

The colorimetry values of the standard cyan color sample of JAPAN color used as the reference are shown below:

L*: 53.6±0.2
a*: −37.4±0.2
b*: −50.2±0.2
ΔE: 0.4 (0.1 to 0.7)

(1) Printer:

MANLORAND R-704, ink: JAPAN Color SF-90, paper: TOKUHISHI ART.

(2) Colorimetry:

Colorimeter: X-rite 938, 0/45, D50, 2 deg., black backing.

<Paper Dependency>

The image formed on the photo gloss paper and the image separately formed on Professional Photo Paper PR101 (QB-JPRA4, produced by Canon) were compared on the color tone. The evaluation was performed by the two-stage rating, that is, A (good) is when the difference between two images is small, and B (bad) is when the difference between two images is large.

<Water Resistance>

The photo gloss paper having formed thereon an image was dried at room temperature for 1 hour, dipped in deionized water for 10 seconds and then naturally dried at room temperature. The blurring was observed and evaluated by the three-stage rating, that is, A is no blurring, B is slight blurring and C is serious blurring.

<Light Fastness>

On the photo gloss paper having formed thereon an image, xenon light (85,000 lx) was irradiated for 14 days using a weather meter (Atlas C. I65). The image density before and after the xenon irradiation was measured by a reflection densitometer (X-Rite 310TR) and evaluated as the dye residual percentage. The reflection density was measured at three points of 1, 1.5 and 2.0. The dye residual percentage was evaluated by the three-stage rating, that is, A is 70% or more at any density, B is less than 70% at one or two points, and C is less than 70% at all densities.

<Dark Heat Preservability>

The photo gloss paper having formed thereon an image was stored for 14 days under the conditions of 80° C. and 15% RH. The image density before and after the storage was measured by a reflection densitometer (X-Rite 310TR) and evaluated as the dye residual percentage. The dye residual percentage was evaluated at three points having a reflection density of 1, 1.5 and 2. A is a dye residual percentage of 90% or more at any density, B is less than 90% at one or two points, and C is less than 90% at all densities.

<Ozone Gas Resistance>

In a box set to an ozone gas concentration of 0.5±0.1 ppm, room temperature and dark place using a Siemens-type ozonizer to which an a.c. voltage of 5 kV was applied while passing a dry air through the double glass tube, the photo gloss paper having formed thereon an image was left standing for 14 days. The image density before and after standing in an ozone gas atmosphere was measured by a reflection densitometer (X-Rite 310TR) and evaluated as the dye residual percentage. The reflection density was measured at three points of 1, 1.5 and 2.0. The ozone gas concentration in the box was set using an ozone gas monitor (Model OZG-EM-01) manufactured by APPLICS. The evaluation was performed by the three-stage rating, namely, A is a dye residual percentage of 70% or more at any density, B is less than 70% at one or two points, and C is less than 70% at all densities.

<Ink Storage Stability>

The solubility of the dye was evaluated by performing tests on the storage stability of ink and recoverability from clogging. In the test on storage stability of ink, each of Ink Solutions A to E was placed in a polyethylene-made container, stored under the condition of −15° C. for 24 hours and subsequently stored under the condition of 60° C. for 24 hours. By taking the storage of −15° C. (24 hours)→60° C. (24 hours) as one cycle, 10 cycles were repeated. The presence or absence of precipitated insoluble matters before and after the storage was examined and evaluated according to the following criteria.

[Criteria]

The recording solution after aging was sampled in a test tube and observed with an eye.

○: Insoluble matters were not observed at all.

Δ: Insoluble matters were slightly observed.

X: Insoluble matters were conspicuously observed and impractical level.

<Recoverability from Clogging>

Each ink was filled in a printer and in the uncapped state, left standing in an environment of 40° C. for one month. From the number of cleaning operations necessary for all nozzles to start normal jetting after the standing, the recoverability was evaluated according to the following criteria.

[Criteria]

A: Recovered by 2 or less cleaning operations.

B: Recovered by 3 to 5 cleaning operations.

C: Recovered by 6 or more cleaning operations.

NG: Not recovered.

<Solubility>

The dye was mixed with 5 ml of distilled water and stirred with a magnetic stirrer for 30 minutes. After the stirring, whether the dye was completely dissolved in the solvent was confirmed. The evaluation was performed according to the following definition by three-stage rating.

○: 0.5 g of dye was completely dissolved in 5 ml of solvent.

Δ: 0.5 g of dye was not completely dissolved but 0.1 g of dye was completely dissolved in 5 ml of solvent.

X: 0.1 g of dye was not completely dissolved in 5 ml of solvent.

<Oxidation Potential: Eox>

The oxidation potential value of phthalocyanine dye (mixture) used in Examples and Comparative Examples was measured under the following conditions. The phthalocyanine dye was weighed in the range from 10.0 to 25.0 mg and the oxidation potential was measured by d.c. polarography using from 5 to 15 ml (dye concentration: about 0.001 $mol \cdot dm^{-3}$) of N,N-dimethylformamide containing 0.1 $mol \cdot dm^{-3}$ tetrapropylammonium perchlorate as the supporting electrolyte. In the polarography device, a carbon (GC) electrode was used as the acting electrode and a rotary platinum electrode was used as the counter electrode. The oxidation wave obtained by the sweep to the oxidation side (positive side) was approximated to a straight line and the midpoint between the intersection with the peak value and the intersection with the residual current value was defined as the oxidation potential value (vs SCE). An oxidation potential of 1.0 or more was rated ○ and an oxidation potential of less than 1.0 was rated X.

TABLE 12

| Sample No. | Compound No. | Phthalocyanine Structure, Substitution Site (α or β) Number of Substituents (n) | Color Tone | Paper Dependency | Water Resistance | Light Fastness | Dark Heat Storability | Ozone Gas Resistance | Ink Storage Stability | Solubility | Recoverability from Clogging | Oxidation Potential (Eox) |
|---|---|---|---|---|---|---|---|---|---|---|---|---|
| Ink Solution A | 103 | β-position (n = 4) | ○ | A | A | A | A | A | ○ | ○ | A | ○ |
| Ink Solution B | 108 | β-position (n = 4) | ○ | A | A | A | A | A | ○ | ○ | A | ○ |
| Ink Solution C | 110 | β-position (n = 4) | ○ | A | A | A | A | A | ○ | ○ | A | ○ |
| Ink Solution D | 146 | β-position (n = 4) | ○ | A | A | A | A | A | ○ | ○ | A | ○ |
| Ink Solution E | 154 | β-position (n = 4) | ○ | A | A | A | A | A | ○ | ○ | A | ○ |
| Ink Solution 101 | Comparative Compound 1 | α,β-position (n = 4, 3, 2) | Δ | B | B | C | B | C | ○ | ○ | A | X (0.75) |
| Ink Solution 102 | Comparative Compound 2 | α-position (n = 4) | Δ | B | B | C | B | C | Δ | Δ | B | X (0.80) |
| Ink Solution 103 | Comparative Compound 3 | β-position (n = 4) | ○ | A | B | B | B | C | X | Δ | C | X (0.82) |

As is apparent from Table 12, the ink for ink jetting of the present invention exhibits excellent color tone, small paper dependency and excellent resistance against water, light and ozone gas. In particular, it is apparent that the image has excellent preservability such as light fastness and ozone gas resistance.

Furthermore, the ink solution prepared by the production method of the present invention is revealed to cause no printing failure due to precipitation of low-soluble components even when exposed to severe storage conditions and be excellent in the ink storage stability and recoverability from clogging.

Example 2

Using the same ink as produced in Example 1, an image was printed on Ink Jet Paper Photo Gloss Paper EX produced by Fuji Photo Film Co., Ltd. by means of the same printer as used in Example 1, and evaluated in the same manner as in Example 1. Then, the same results as in Example 1 were obtained.

Example 3

The same ink as produced in Example 1 was filled in a cartridge of Ink Jet Printer BJ-F850 (manufactured by CANON) and using this printer, an image was printed on a photo gloss paper GP-301 produced by the same company and evaluated in the same manner as in Example 1. Then, the same results as in Example 1 were obtained.

Example 4

A test was performed by using the same operation as in Example 1 except that the test method of Example 1 was changed to the following environmental test method. That is, an oxidative gas resistance test simulating the outdoor environment exposed to oxidative gases such as exhaust gas of automobile and irradiation with solar light was performed according to an oxidation resistance test method using a fluorescent light irradiation chamber at a relative humidity of 80% and a hydrogen peroxide concentration of 120 ppm described in H. Iwano et al., *Journal of Imaging Science and Technology*, Vol. 38, 140–142 (1944). The test results were the same as those in Example 1.

While the invention has been described and with reference to specific embodiment thereof, it will be apparent to one skilled in the art that various changes and modifications can be made therein without departing from the spirit and scope thereof.

This application is based on Japanese patent application Nos. 2002-12868 field on Jan. 22, 2002 and 2002-12990 filed on Jan. 22, 2002.

INDUSTRIAL APPLICABILITY

Phthalocyanine-base dyes widely used in general at present, represented by Direct Blue 87 and Direct Blue 199 are excellent in the light fastness as compared with magenta and yellow dyes, however, are disadvantageously liable to cause a problem ascribable to the solubility of dye. For example, on great occasions, dissolution failure occurs at the production to cause a production trouble or insoluble matters precipitate during storage or on use of the product to bring about a problem. Particularly, in the ink jet recording, clogging of printing head or ejection failure is caused by the precipitation of dye and this gives rise to a problem of serious deterioration of the printed image.

Furthermore, discoloration readily occurs due to oxidative gases such as ozone, which are often taken as a problem also from an environmental issue, and this causes a large problem of great reduction in the printing density.

In view of the above problems, the following effects have been found out by the present invention.

The dye mixture of the present invention is a novel dye mixture having absorption properties with excellent color reproducibility as a dye for three primary colors and having sufficiently high fastness to light, heat, humidity and active gas in the environment. The ink comprising this dye mixture gives a colored image or material excellent in the (color) hue and fastness. Furthermore, by use of this dye mixture, an image recording method and a method for improving the preservability of formed image can be provided, where an image having good (color) hue and high fastness to heat, water, light and active gas in the environment, particularly ozone gas, can be formed.

What is claimed is:

1. A dye mixture comprising a plurality of different dyes represented by the following formula (I):

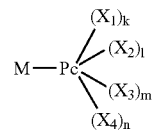

Formula (II):

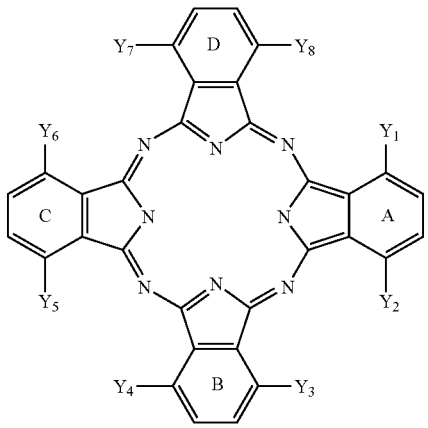

wherein M represents a hydrogen atom, a metal atom or an oxide, hydroxide or halide thereof; Pc represents a (k+l+m+n)-valent phthalocyanine nucleus represented by formula (II); $X_1$, $X_2$, $X_3$ and $X_4$ each independently represents a substituent selected from the group consisting of —SO—$R_1$, —$SO_2$—$R_1$, —$SO_2NR_2R_3$, —$CONR_2R_3$, —$CO_2$—$R_1$ and CO—$R_1$ and each of four benzene rings {A, B, C and D in formula (II)} of the phthalocyanine nucleus has at its β-position at least one substituent of $X_1$, $X_2$, $X_3$ and $X_4$, provided that the case where $X_1$, $X_2$, $X_3$ and $X_4$ all are the same is excluded and at least one of $X_1$, $X_2$, $X_3$ and $X_4$ has an ionic hydrophilic group as a substituent; $R_1$ represents a substituted or unsubstituted alkyl group, a substituted or unsubstituted aryl group or a substituted or unsubstituted heterocyclic group; $R_2$ represents a hydrogen atom, a substituted or unsubstituted alkyl group, a substituted or unsubstituted aryl group or a substituted or unsubstituted heterocyclic group;

$R_3$ represents a substituted or unsubstituted alkyl group, a substituted or unsubstituted aryl group or a substituted or unsubstituted heterocyclic group; k, l, m and n represent an integer of $0<k<8$, an integer of $0<l<8$, an integer of $0\leq m<8$ and an integer of $0\leq n<8$, provided that k and/or l and/or m and/or n each independently represents a number satisfying $4\leq k+l+m+n\leq 8$; and $Y_1, Y_2, Y_3, Y_4, Y_5, Y_6, Y_7$ and $Y_8$ each independently represents a hydrogen atom and/or a monovalent substituent and these monovalent substituents each may further have a substituent.

2. The dye mixture as claimed in claim 1, wherein the phthalocyanine nucleus represented by formula (II) is represented by the following formula (III):

Formula (III)

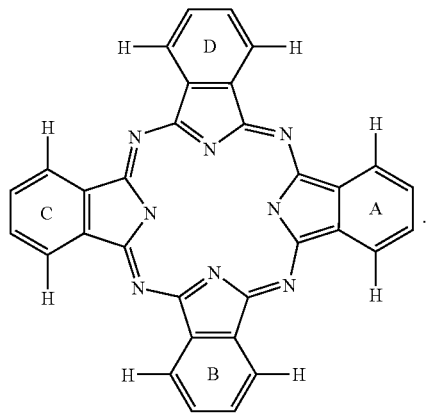

3. The dye mixture as claimed in claim 1, wherein in the dye represented by formula (I), $X_1, X_2, X_3$ and $X_4$ each independently represents a substituent selected from the group consisting of —SO—$R_1$, —$SO_2$—$R_1$ and —$SO_2NR_2R_3$.

4. The dye mixture as claimed in claim 1, wherein the dye represented by formula (I) is represented by the following formula (IV):

Formula (IV):

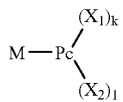

wherein M represents a hydrogen atom, a metal atom or an oxide, hydroxide or halide thereof; Pc represents a (k+l)-valent phthalocyanine nucleus represented by formula (III); $X_1$ and $X_2$ each independently represents a substituent selected from the group consisting of —SO—$R_1$, —$SO_2$—$R_1$ and —$SO_2NR_2R_3$ and at least one substituent represented by $X_1$ and at least one substituent represented by $X_2$ are present in respective rings of four benzene rings {A, B, C and D in formula (III)} of the phthalocyanine nucleus, provided that $X_1$ and $X_2$ are not the same and at least one of $X_1$ and $X_2$ has an ionic hydrophilic group as a substituent; $R_1$ represents a substituted or unsubstituted alkyl group, a substituted or unsubstituted aryl group or a substituted or unsubstituted heterocyclic group; $R_2$ represents a hydrogen atom, a substituted or unsubstituted alkyl group, a substituted or unsubstituted aryl group or a substituted or unsubstituted heterocyclic group; $R_3$ represents a substituted or unsubstituted alkyl group, a substituted or unsubstituted aryl group or a substituted or unsubstituted heterocyclic group; k and l represent an integer of $0<k<8$ and an integer of $0<l<8$, provided that k and/or l each independently represents a number satisfying $4\leq k+l\leq 8$.

5. The dye mixture as claimed in claim 1, wherein in formulae (I) and (II), at least one group of $X_1$ to $X_4$ and $Y_1$ to $Y_8$ has at least one asymmetric carbon.

6. An ink comprising the dye mixture claimed in claim 1.

7. An ink as claimed in claim 6, which is used as an ink for ink jet recording.

8. An ink jet recording method comprising forming an image using the ink claimed in claim 7 on an image-receiving material comprising a support having thereon an ink image-receiving layer containing a white inorganic pigment particle.

9. A method for improving ozone resistance of a colored image material, comprising forming an image using the ink claimed in claim 7.

* * * * *